(12) United States Patent
Iwasaki

(10) Patent No.: US 8,690,988 B2
(45) Date of Patent: Apr. 8, 2014

(54) USE OF BIMODAL CARBON DISTRIBUTION IN COMPACTS FOR PRODUCING METALLIC IRON NODULES

(71) Applicant: Nu-Iron Technology, LLC, Charlotte, NC (US)

(72) Inventor: Iwao Iwasaki, Tokyo (JP)

(73) Assignee: Nu-Iron Technology, LLC, Charlotte, NC (US)

( * ) Notice: Subject to any disclaimer, the term of this patent is extended or adjusted under 35 U.S.C. 154(b) by 0 days.

(21) Appl. No.: 13/653,186

(22) Filed: Oct. 16, 2012

(65) Prior Publication Data

US 2013/0291685 A1    Nov. 7, 2013

Related U.S. Application Data

(63) Continuation of application No. 12/977,035, filed on Dec. 22, 2010, now Pat. No. 8,287,621.

(51) Int. Cl.
C21B 13/10    (2006.01)
C22B 1/14    (2006.01)

(52) U.S. Cl.
USPC .............................................. 75/503; 75/770

(58) Field of Classification Search
USPC ................................................... 75/503, 770
See application file for complete search history.

(56) References Cited

U.S. PATENT DOCUMENTS

| 1,065,890 A | 6/1913 | Sieurin |
| 1,868,952 A | 7/1932 | Simpson |
| 1,885,381 A | 11/1932 | Simpson |
| 2,072,072 A | 2/1937 | Hartgen |
| 2,674,531 A | 4/1954 | Udy |
| 2,793,109 A | 5/1957 | Huebler et al. |
| 3,443,931 A | 5/1969 | Beggs et al. |

(Continued)

FOREIGN PATENT DOCUMENTS

| DE | 19543074 | 5/1997 |
| EP | 1405925 | 4/2004 |

(Continued)

OTHER PUBLICATIONS

Steel Times, "The Comet Process—DRI from fines and coal", Nov. 1996, p. 399.

(Continued)

*Primary Examiner* — George Wyszomierski
*Assistant Examiner* — Tima M McGuthry Banks
(74) *Attorney, Agent, or Firm* — Hahn, Loeser & Parks LLP; Arland T. Stein

(57) ABSTRACT

A method for use in production of metallic iron nodules comprising providing a reducible mixture into a hearth furnace for the production of metallic iron nodules, where the reducible mixture comprises a quantity of reducible iron bearing material, a quantity of first carbonaceous reducing material of a size less than about 28 mesh of an amount between about 65 percent and about 95 percent of a stoichiometric amount necessary for complete iron reduction of the reducible iron bearing material, and a quantity of second carbonaceous reducing material with an average particle size greater than average particle size of the first carbonaceous reducing material and a size between about 3 mesh and about 48 mesh of an amount between about 20 percent and about 60 percent of a stoichiometric amount of necessary for complete iron reduction of the reducible iron bearing material.

17 Claims, 15 Drawing Sheets

(56) References Cited

U.S. PATENT DOCUMENTS

| | | |
|---|---|---|
| 3,452,972 A | 7/1969 | Beggs |
| 3,770,417 A | 11/1973 | Kranz |
| 4,416,688 A | 11/1983 | Greenweld |
| 4,436,551 A | 3/1984 | Mori |
| 4,676,741 A | 6/1987 | Pargeter |
| 4,701,214 A | 10/1987 | Kaneko et al. |
| 4,728,358 A | 3/1988 | Hoffman et al. |
| 5,186,741 A | 2/1993 | Kotraba et al. |
| 5,316,471 A | 5/1994 | Nell |
| 5,567,224 A | 10/1996 | Kundrat |
| 5,601,631 A | 2/1997 | Rinker et al. |
| 5,637,133 A | 6/1997 | Munnix et al. |
| 5,730,775 A | 3/1998 | Meissner et al. |
| 5,899,689 A | 5/1999 | Fontana |
| 5,972,066 A | 10/1999 | Lehtinen |
| 6,015,527 A | 1/2000 | Kamei et al. |
| 6,036,744 A | 3/2000 | Negami et al. |
| 6,270,551 B1 | 8/2001 | Rinker |
| 6,270,552 B1 | 8/2001 | Takeda et al. |
| 6,284,017 B1 | 9/2001 | Kamei et al. |
| 6,342,089 B1 | 1/2002 | McGaa |
| 6,368,104 B1 | 4/2002 | Saxena et al. |
| 6,413,295 B2 | 7/2002 | Meissner et al. |
| 6,494,933 B1 | 12/2002 | Saage et al. |
| 6,630,010 B2 | 10/2003 | Ito et al. |
| 6,652,802 B2 | 11/2003 | Sherwood |
| 6,749,664 B1 | 6/2004 | Hoffman et al. |
| 6,802,886 B2 | 10/2004 | Hoffman et al. |
| 6,837,916 B2 | 1/2005 | Kawakami et al. |
| 7,628,839 B2 | 12/2009 | Iwasaki |
| 7,632,335 B2 | 12/2009 | Iwasaki |
| 7,641,712 B2 | 1/2010 | Iwasaki |
| 7,695,544 B2 | 4/2010 | Iwasaki et al. |
| 8,158,054 B2 | 4/2012 | Iwasaki et al. |
| 8,287,621 B2 * | 10/2012 | Iwasaki .......................... 75/503 |
| 2001/0052273 A1 | 12/2001 | Meissner et al. |
| 2003/0047038 A1 | 3/2003 | Iwasaki et al. |
| 2003/0097908 A1 | 5/2003 | Hoffman et al. |
| 2003/0110891 A1 | 6/2003 | Vanderheyden et al. |
| 2004/0076539 A1 | 4/2004 | Ito et al. |
| 2005/0061207 A1 | 3/2005 | Liu |
| 2005/0092130 A1 | 5/2005 | Golberger et al. |
| 2006/0150772 A1 | 7/2006 | Iwasaki et al. |
| 2009/0031859 A1 | 2/2009 | Tsuge et al. |
| 2009/0175753 A1 | 7/2009 | Iwasaki et al. |

FOREIGN PATENT DOCUMENTS

| | | |
|---|---|---|
| EP | 1605067 | 12/2005 |
| EP | 1405924 | 8/2007 |
| GB | 642339 | 8/1956 |
| JP | 11050119 | 2/1999 |
| KR | 10-1989-0002217 | 6/1989 |
| KR | 10-2000-00556944 | 9/2000 |
| WO | 0109394 | 2/2001 |
| WO | 2004-083463 | 9/2004 |
| WO | 2006-061790 | 6/2006 |

OTHER PUBLICATIONS

International Search Report, International Application No. PCT/US2011/065526, Mailed Sep. 14, 2012.

* cited by examiner

| | $SiO_2$ | $Al_2O_3$ | CaO | MgO | Fe | S | LOI |
|---|---|---|---|---|---|---|---|
| $Al(OH)_3$ I | --- | 29.94 | --- | --- | --- | --- | --- |
| $Al(OH)_3$ II | --- | 55.90 | --- | --- | --- | --- | --- |
| Bauxite | 2.53 | 57.35 | 0.09 | 0.04 | 7.2 | --- | --- |
| Bentonite | 63.46 | 25.70 | 4.53 | 1.40 | 2.26 | --- | --- |
| $Ca(OH)_2$ | --- | --- | 75.7 | --- | --- | --- | --- |
| Lime hydrate | 0.71 | 0.65 | 76.67 | 1.12 | --- | --- | 30.84 |
| Limestone | 0.70 | 0.27 | 47.90 | 0.95 | 0.10 | --- | 43.99 |
| Portland cement | 19.61 | 4.63 | 66.65 | 3.32 | 1.77 | 0.90 | --- |

Fig. 4

|  | Mill scale | Coal$^{(1)}$ ash | Hydrated lime | Fluorspar |
|---|---|---|---|---|
| T.Fe | 70.57 | 6.31 | | |
| met Fe | 1.84 | | | |
| FeO | 61.35 | | | |
| SiO$_2$ | 1.94 | 51.29 | 0.43 | 1.87 |
| Al$_2$O$_3$ | 0.37 | 27.08 | 0.00 | 0.12 |
| CaO | 1.28 | 3.21 | 68.8 | 1.28 |
| MgO | 0.13 | 1.51 | 0.32 | 0.00 |
| Mn | 0.55 | | | |
| Cu | 0.05 | | | |
| Ni | 0.02 | | | |
| Cr | 0.03 | | | |
| Mo | | | | |
| Zn | | | | |
| Cd | | | | |
| Pb | | | | |
| P | BDL | 0.13 | | |
| S | 0.03 | 1.16 | | |
| C | 0.60 | | | |

$^{(1)}$ High-volatile bituminous coal.

Fig. 5

|  | As rec'd | Dry basis |
|---|---|---|
| Moisture | 2.63 | |
| Volatile | 36.32 | 37.55 |
| Fixed carbon | 54.10 | 55.32 |
| Ash | 6.95 | 7.13 |
| Sulfur | 0.84 | 0.87 |
| Btu/lb | 13581 | 13948 |

Fig. 6

|  | Mill scale | |
|---|---|---|
| Mesh | %wt | cum %wt |
| 3/8" | | |
| 3 | 0.7 | 100.0 |
| 4 | 0.4 | 99.3 |
| 6 | 0.6 | 98.9 |
| 8 | 1.8 | 98.2 |
| 10 | 7.6 | 96.4 |
| 14 | 12.1 | 76.8 |
| 20 | 18.8 | 58.0 |
| 28 | 19.2 | 38.7 |
| 35 | 11.8 | 27.0 |
| 48 | 9.3 | 17.7 |
| 65 | 6.5 | 11.1 |
| 100 | 5.1 | 6.1 |
| -100 | 6.1 | |

Fig. 7

| Coal[1] % stoich. | Mix No. | Mill scale | Coal[1] | Hydrated lime | Fluorspar |
|---|---|---|---|---|---|
| 75 | P-787 | 76.65 | 18.10 | 3.25 | 2.0 |
| 80 | P-788 | 75.65 | 19.05 | 3.30 | 2.0 |
| 85 | P-752 | 74.69 | 19.98 | 3.33 | 2.0 |
| 90 | P-789 | 73.73 | 20.89 | 3.38 | 2.0 |
| 95 | P-756 | 72.80 | 21.77 | 3.43 | 2.0 |
| 100 | P-790 | 71.91 | 22.64 | 3.45 | 2.0 |
| 105 | P-757 | 71.02 | 23.48 | 3.50 | 2.0 |
| 115 | P-758 | 69.31 | 25.09 | 3.60 | 2.0 |
| 80 | P-788 | 75.65 | 19.05 | 3.30 | 2.0 |
| 75 | P-787 | 76.65 | 18.10 | 3.25 | 2.0 |
| 70 | P-857 | 77.68 | 17.12 | 3.20 | 2.0 |

[1] High-volatile bituminous coal.

Fig. 8

| Coal[1] + Recyc. Anthracite (% stoich.) | Mix No. | Mill scale | Coal[1] | Recycled anthracite | Hydrated lime | Fluorspar |
|---|---|---|---|---|---|---|
| Total Carbon 115% Stoich: | | | | | | |
| 70%+45% | P-786 | 71.37 | 15.73 | 6.76 | 4.15 | 2.0 |
| 75%+40% | P-775 | 71.14 | 16.79 | 5.99 | 4.08 | 2.0 |
| 80%+35% | P-777 | 70.88 | 17.85 | 5.22 | 4.05 | 2.0 |
| 85%+30% | P-763 | 70.65 | 18.90 | 4.46 | 3.98 | 2.0 |
| 90%+25% | P-779 | 70.44 | 19.96 | 3.71 | 3.90 | 2.0 |
| 95%+20% | P-766 | 70.20 | 20.99 | 2.95 | 3.85 | 2.0 |
| Total Carbon 125% Stoich: | | | | | | |
| 75%+50% | P-783 | 69.86 | 16.49 | 7.35 | 4.30 | 2.0 |
| 80%+45% | P-784 | 69.64 | 17.54 | 6.59 | 4.23 | 2.0 |
| 85%+40% | P-781 | 69.43 | 18.58 | 5.84 | 4.15 | 2.0 |
| 90%+35% | P-785 | 69.20 | 19.60 | 5.10 | 4.10 | 2.0 |

[1] High-volatile bituminous coal.

Fig. 9

|  |  |  |  |  |  |  |  | % stoichiometric | |
|---|---|---|---|---|---|---|---|---|---|
| Mixture No. | Mill scale | Coal[1] | Recy. anthracite | Lime, hydrate | Fluorspar | $B_2$ Basicity | $B_4$ Basicity | Coal[1] | Recy. anthracite |
| P-831 | 71.37 | 18.23 | 5.72 | 2.68 | 2 | 1.5 | 1.29 | 85 | 30 |
| P-832 | 70.17 | 17.92 | 7.03 | 2.88 | 2 | 1.5 | 1.28 | 85 | 40 |
| P-833 | 69.03 | 17.63 | 8.29 | 3.05 | 2 | 1.5 | 1.27 | 85 | 50 |
| P-834 | 67.89 | 17.34 | 9.52 | 3.25 | 2 | 1.5 | 1.25 | 85 | 60 |
| P-900 | 68.96 | 20.72 | 5.52 | 2.8 | 2 | 1.5 | 1.27 | 100 | 40 |
| P-902 | 66.74 | 20.06 | 8.02 | 3.18 | 2 | 1.5 | 1.24 | 100 | 60 |
| P-903 | 69.75 | 19.91 | 5.59 | 2.75 | 2 | 1.5 | 1.27 | 95 | 40 |
| P-904 | 68.18 | 21.51 | 5.46 | 2.85 | 2 | 1.5 | 1.26 | 105 | 40 |
| P-905 | 66.69 | 23.04 | 5.34 | 2.93 | 2 | 1.5 | 1.26 | 115 | 40 |
| P-906 | 65.26 | 24.51 | 5.23 | 3 | 2 | 1.5 | 1.25 | 125 | 40 |
| P-919 | 64.67 | 19.43 | 10.36 | 3.53 | 2 | 1.5 | 1.24 | 100 | 80 |
| P-920 | 62.74 | 18.85 | 12.56 | 3.85 | 2 | 1.5 | 1.22 | 100 | 100 |
| P-929 | 70.56 | 19.08 | 5.65 | 2.7 | 2 | 1.5 | 1.27 | 90 | 40 |
| P-930 | 69.39 | 18.76 | 6.95 | 2.9 | 2 | 1.5 | 1.26 | 90 | 50 |
| P-931 | 68.24 | 18.46 | 8.2 | 3.1 | 2 | 1.5 | 1.25 | 90 | 60 |
| P-932 | 67.13 | 18.15 | 9.41 | 3.3 | 2 | 1.5 | 1.24 | 90 | 70 |
| P-935 | 68.43 | 20.56 | 5.48 | 3.53 | 2 | 1.7 | 1.42 | 100 | 40 |
| P-936 | 67.91 | 20.4 | 5.44 | 4.25 | 2 | 1.9 | 1.57 | 100 | 40 |
| P-937 | 66.2 | 19.89 | 7.95 | 3.95 | 2 | 1.7 | 1.39 | 100 | 60 |
| P-938 | 65.67 | 19.73 | 7.89 | 4.7 | 2 | 1.9 | 1.54 | 100 | 60 |
| P-939 | 70.01 | 18.93 | 5.61 | 3.45 | 2 | 1.7 | 1.43 | 90 | 40 |
| P-940 | 69.49 | 18.79 | 5.57 | 4.15 | 2 | 1.9 | 1.58 | 90 | 40 |
| P-941 | 67.71 | 18.31 | 8.14 | 3.85 | 2 | 1.7 | 1.4 | 90 | 60 |
| P-942 | 67.17 | 18.16 | 8.07 | 4.6 | 2 | 1.9 | 1.55 | 90 | 60 |
| P-947 | 66.92 | 22.12 | 5.36 | 3.6 | 2 | 1.7 | 1.41 | 110 | 40 |
| P-948 | 66.39 | 21.94 | 5.32 | 4.35 | 2 | 1.9 | 1.57 | 110 | 40 |
| P-949 | 64.8 | 21.42 | 7.79 | 4 | 2 | 1.7 | 1.38 | 110 | 60 |
| P-950 | 64.28 | 21.25 | 7.72 | 4.75 | 2 | 1.9 | 1.53 | 110 | 60 |
| P-951 | 67.4 | 20.25 | 5.4 | 4.95 | 2 | 2.1 | 1.72 | 100 | 40 |
| P-952 | 66.89 | 20.1 | 5.36 | 5.65 | 2 | 2.3 | 1.88 | 100 | 40 |
| P-953 | 65.16 | 19.58 | 7.83 | 5.43 | 2 | 2.1 | 1.69 | 100 | 40 |
| P-954 | 64.65 | 19.43 | 7.77 | 6.15 | 2 | 2.3 | 1.84 | 100 | 40 |
| P-955 | 66.54 | 20 | 5.33 | 4.13 | 4 | 1.9 | 1.57 | 100 | 40 |
| P-956 | 66.04 | 19.84 | 5.29 | 4.83 | 4 | 2.1 | 1.72 | 100 | 40 |
| P-957 | 64.37 | 19.34 | 7.74 | 4.55 | 4 | 1.9 | 1.54 | 100 | 60 |
| P-958 | 63.84 | 19.18 | 7.67 | 5.3 | 4 | 2.1 | 1.69 | 100 | 60 |
| P-959 | 67.21 | 18.96 | 5.38 | 6.45 | 2 | 2.5 | 2.03 | 100 | 40 |
| P-960 | 66.71 | 18.82 | 5.34 | 7.13 | 2 | 2.7 | 2.19 | 100 | 40 |
| P-961 | 64.9 | 18.31 | 7.8 | 7 | 2 | 2.5 | 1.99 | 100 | 60 |
| P-962 | 64.4 | 18.16 | 7.74 | 7.7 | 2 | 2.7 | 2.15 | 100 | 60 |

[1] High-volatile bituminous coal.

Fig. 10

|  | LHF 920 | LHF 921 | LHF 922 | LHF 923 | LHF 924 | LHF 925 |
|---|---|---|---|---|---|---|
| Tray: | | | | | | |
| Hearth layer | Recy anth | Recy anth | Recy anth | Recy anth | Recy anth | Recy anth |
| Size | 6/28 | 6/28 | 6/28 | 6/28 | 6/28 | 6/28 |
| lb/ft2 | 1/2" | 1/2" | 1/2" | 1/2" | 1/2" | 1/2" |
| | | | | | | |
| Briquettes | P-900/920 | P-900/920 | P-935/938 | P-935/938 | P-935/938 | P-935/938 |
| Loading | 4 islands | 4 islands | 4 islands | 4 islands | 4 islands | 4 islands |
| No. of layers | Single | Single | Single | Single | Single | Single |
| | | | | | | |
| Cover layer | None | None | None | None | None | None |
| Size | | | | | | |
| lb/ft2 | | | | | | |
| LHF: | | | | | | |
| Tray, inch/min | 9 | 8 | 8 | 10 | 12 | 12 |
| residence | 31 min | 35 min | 35 min | 28 min[1] | 27.5 min[1] | 26.5 min[1] |
| | | | | | | |
| Zone 1 | | | | | | |
| TC reading,°F | 2163 | 2163 | 2164 | 2163 | 2163 | 2163 |
| H2O, inch | 1.13 | 1.13 | 1.13 | 1.13 | 1.13 | 1.13 |
| O2, % | 2.93 | 6.24 | 6.72 | 6.88 | 6.48 | 7.77 |
| Zone 2 | | | | | | |
| TC reading | 2494 | 2494 | 2490 | 2494 | 2494 | 2494 |
| H2O, inch | 0.03 | 0.03 | 0.03 | 0.03 | 0.03 | 0.03 |
| O2, % | 0.65 | 0.67 | 0.69 | 0.70 | 0.70 | 0.71 |
| Zone 3 | | | | | | |
| TC reading | 2575 | 2575 | 2578 | 2575 | 2575 | 2575 |
| H2O, inch | 0.02 | 0.02 | 0.02 | 0.02 | 0.03 | 0.02 |
| O2, % | 0.25 | 0.26 | 0.26 | 0.27 | 0.27 | 0.27 |
| Products: | P-900 none | P-900 some | All fused | All fused | All fused | All fused |
| % fused | P-902 most | P-902 all | | | | |
| | P-919 all | P-919 all | | | | |
| | P-920 all | P-920 all | | | | |

Fig. 13

|  | Mill scale | Coal[1] | Recy. anth. (6/28M) | Lime, hydrated | Fluorspar | Basicity $B_2$ | Basicity $B_4$ | % Stoichiometric | |
|---|---|---|---|---|---|---|---|---|---|
|  |  |  |  |  |  |  |  | Coal[1] | Recy. anthracite |
| P-984 | 64.99 | 15.58 | 7.81 | 7.63 | 4 | 2.7 | 2.1 | 85 | 60 |
| P-985 | 66.42 | 15.92 | 7.98 | 7.68 | 2 | 2.7 | 2.1 | 85 | 60 |
| P-988 | 67.41 | 16.16 | 5.4 | 7.03 | 4 | 2.7 | 2.2 | 85 | 40 |
| P-989 | 68.89 | 16.51 | 5.52 | 7.08 | 2 | 2.7 | 2.2 | 85 | 40 |
| P-990 | 67.49 | 16.18 | 8.11 | 6.23 | 2 | 2.3 | 1.8 | 85 | 60 |
| P-991 | 66.77 | 16.01 | 8.02 | 6.2 | 3 | 2.3 | 1.8 | 85 | 60 |
| P-992 | 70.48 | 16.89 | 5.64 | 4.98 | 2 | 2.1 | 1.7 | 85 | 40 |
| P-993 | 69.75 | 16.72 | 5.59 | 4.95 | 3 | 2.1 | 1.7 | 85 | 40 |
| P-994 | 69.55 | 14.71 | 8.36 | 5.38 | 2 | 2.1 | 1.7 | 75 | 60 |
| P-995 | 68.8 | 14.55 | 8.27 | 5.38 | 3 | 2.1 | 1.7 | 75 | 60 |
| P-996 | 69.95 | 16.77 | 5.6 | 5.68 | 2 | 2.3 | 1.9 | 85 | 40 |
| P-997 | 69.19 | 14.59 | 5.54 | 5.68 | 3 | 2.3 | 1.9 | 85 | 40 |
| P-998 | 68.99 | 14.59 | 8.29 | 6.13 | 2 | 2.3 | 1.85 | 75 | 60 |
| P-999 | 68.26 | 14.44 | 8.2 | 6.1 | 3 | 2.3 | 1.85 | 75 | 60 |
| P-1000 | 66.96 | 16.05 | 8.04 | 6.95 | 2 | 2.5 | 2 | 85 | 60 |
| P-1001 | 66.24 | 15.88 | 7.96 | 6.93 | 3 | 2.5 | 2 | 85 | 60 |
| P-1002 | 69.4 | 16.64 | 5.56 | 6.4 | 2 | 2.5 | 2 | 85 | 40 |
| P-1003 | 68.66 | 16.46 | 5.5 | 6.38 | 3 | 2.5 | 2 | 85 | 40 |
| P-1004 | 68.45 | 14.48 | 8.22 | 6.85 | 2 | 2.5 | 2 | 75 | 60 |
| P-1005 | 67.71 | 14.32 | 8.13 | 6.83 | 3 | 2.5 | 2 | 75 | 60 |

[1] High-volatile bituminous coal.

Fig. 15

|  | P-1081 | P-1082 | P-1083 | P-1084 | P-1087 |
|---|---|---|---|---|---|
| Taconite Concentrate | 63.66 | 65.32 | 64.48 | 66.02 | 64.49 |
| Med. Vol. Bituminous Coal | 15.12 | 15.52 | 15.32 | 15.68 | 15.32 |
| Recycled anthracite (14/48 mesh) | 6.30 | 6.47 | 3.39 | 6.54 | 6.39 |
| Lime, hydrated | 10.40 | 8.60 | 10.40 | 8.65 | 9.50 |
| Flourspar | 2.00 | 2.00 | 2.00 | 2.00 | 2.00 |
| Bauxite | 2.51 | 2.09 | 1.42 | 1.11 | 2.30 |
| % stoichiometric |  |  |  |  |  |
| Med. Vol. Bituminous Coal | 85 | 85 | 85 | 85 | 85 |
| Recycled anthracite | 40 | 40 | 40 | 40 | 40 |
| %$SiO_2$ | 25.06 | 28.50 | 26.25 | 29.74 | 26.69 |
| %$Al_2O_3$ | 15.01 | 15.01 | 11.19 | 11.15 | 15.01 |
| %$CaO$ | 57.75 | 54.06 | 60.26 | 56.56 | 56.01 |
| %$MgO$ | 2.18 | 2.43 | 2.30 | 2.55 | 2.30 |
| $B_2$ | 2.30 | 1.90 | 2.30 | 1.90 | 2.10 |
| $B_4$ | 1.50 | 1.30 | 1.67 | 1.45 | 1.40 |

Fig. 16A

|  | P-1088 | P-1089 | P-1090 | P-1093 | P-1094 |
|---|---|---|---|---|---|
| Taconite Concentrate | 65.24 | 66.15 | 66.81 | 67.65 | 66.98 |
| Med. Vol. Bituminous Coal | 15.50 | 15.72 | 15.87 | 16.07 | 15.91 |
| Recycled anthracite (14/48 mesh) | 6.46 | 6.55 | 6.62 | 6.70 | 6.63 |
| Lime, hydrated | 9.55 | 7.70 | 7.75 | 6.80 | 6.80 |
| Flourspar | 2.00 | 2.00 | 2.00 | 2.00 | 2.00 |
| Bauxite | 1.25 | 1.88 | 0.95 | 0.78 | 1.67 |
| % stoichiometric |  |  |  |  |  |
| Med. Vol. Bituminous Coal | 85 | 85 | 85 | 85 | 85 |
| Recycled anthracite | 40 | 40 | 40 | 40 | 40 |
| %$SiO_2$ | 27.88 | 30.53 | 31.86 | 34.40 | 32.83 |
| %$Al_2O_3$ | 11.09 | 15.02 | 11.12 | 11.09 | 15.02 |
| %$CaO$ | 58.61 | 51.87 | 54.31 | 51.62 | 49.40 |
| %$MgO$ | 2.42 | 2.58 | 2.71 | 2.89 | 2.75 |
| $B_2$ | 2.10 | 1.70 | 1.70 | 1.50 | 1.50 |
| $B_4$ | 1.57 | 1.20 | 1.33 | 1.20 | 1.09 |

USE OF BIMODAL CARBON DISTRIBUTION IN COMPACTS FOR PRODUCING METALLIC IRON NODULES

This application is a continuation of and claims the benefit of U.S. patent application Ser. No. 12/977,035, filed on Dec. 22, 2010, now U.S. Pat. No. 8,287,621, issued on Oct. 16, 2012, the disclosure of which is incorporated herein by reference.

STATEMENT REGARDING FEDERALLY SPONSORED RESEARCH

The present invention was made with support by the Department of Energy, Sponsor Award DE-FG36-05GO15185. The United States government has certain rights in the invention.

BACKGROUND AND SUMMARY

The present invention relates to reduction of iron bearing materials such as iron ore to metallic iron nodules (known as "NRI").

Metallic iron has been produced by reducing iron oxide such as iron ores, iron pellets, and other iron sources. Various such methods have been proposed so far for directly producing metallic iron from iron ores or iron oxide pellets by using reducing agents such as coal or other carbonaceous material. Such fusion reduction processes generally involve the following processing steps: feed preparation, drying, preheating, reduction, fusion/melting, cooling, product discharge, and metallic iron/slag product separation. These processes result in direct reduction of iron bearing material to metallic iron nodules (NRI) and slag. Metallic iron nodules produced by these direct reduction processes are characterized by near total reduction, approaching 100% metal (e.g., about 96% or more metallic Fe). Percents (%) herein are percents by weight unless otherwise stated.

Unlike conventional direct reduced iron (DRI) product, the metallic iron nodule (NRI) product has little or no gangue and little or no porosity. NRI is essentially metallic iron product desirable for many applications, such as use in place of scrap in steelmaking by electric arc furnaces. Metallic iron nodules are generally as easy to handle as taconite pellets and DRI and are a more efficient and effective substitute for scrap in steel making by electric arc furnace (EAF) without extending heat times and increasing energy cost in making steel.

Various types of hearth furnaces have been described and used for direct reduction of NRI. One type of hearth furnace used to make NRI is a rotary hearth furnace (RHF). The rotary hearth furnace is partitioned annularly into temperature zones between a supply location and the discharge location of the furnace. An annular hearth is supported rotationally in the furnace to move from zone to zone carrying reducible material the successive zones to reduce and fuse the reducible material into metallic iron nodules, using one or more heating sources (e.g., natural gas burners). The reduced and fused NRI product, after completion of the process, is cooled to prevent reoxidation and facilitate discharge from the furnace. Another type of furnace used for making NRI is the linear hearth furnace such as described in U.S. Pat. No. 7,413,592, where similarly prepared mixtures of reducible material are moved on moving hearth sections or cars through a drying/preheating zone, a reduction zone, a fusion zone, and a cooling zone, between the charging end and discharging end of a linear furnace while being heated above the melting point of iron. As one example, a method for use in production of metallic iron nodules is disclosed in U.S. Pat. No. 7,628,839.

It has been desired in the production of NRI to reduce the amount of time for reduction and fusion of reducible material in forming metallic iron nodules while reducing the amount of sulfur in the nodules and limiting the formation of micro metallic iron nodules. Micro metallic iron nodules (called micro-nodules or micro NRI) include small particles of agglomerated iron having a size between about 20 mesh and about 3 mesh.

What is disclosed is a method for use in production of metallic iron nodules comprising the steps of
  providing a hearth comprising refractory material;
  providing reducible mixture above at least a portion of the refractory material, the reducible mixture comprising at least reducing material and reducible iron bearing material;
  forming the reducible mixture to comprise:
    a quantity of reducible iron bearing material,
  forming the reducible mixture to comprise:
    a quantity of reducible iron bearing material,
    a quantity of first carbonaceous reducing material of a size less than about 48 mesh of an amount between about 65 percent and about 95 percent of a stoichiometric amount necessary for complete iron reduction of the reducible iron bearing material, and
    a quantity of second carbonaceous reducing material with an average particle size greater than average particle size of the first carbonaceous reducing material and a size between about 3 mesh and about 48 mesh of an amount between about 20 percent and about 65 percent of a stoichiometric amount of necessary for complete iron reduction of the reducible iron bearing material;
    where amount of first carbonaceous reducing material and second carbonaceous reducing material provide total reducing material carbon between about 110 and 150 percent of a stoichiometric amount necessary for complete iron reduction of the reducible iron bearing material, and
  thermally treating the reducible mixture in the presence of other carbonaceous material separate from the reducible mixture to form one or more metallic iron nodules by melting.

The quantity of first carbonaceous reducing material may be of an amount between about 80 percent and about 90 percent of a stoichiometric amount necessary for complete iron reduction of the reducible iron bearing material. Alternatively, the quantity of first carbonaceous reducing material may be of an amount between about 85 percent and about 95 percent of a stoichiometric amount necessary for complete iron reduction of the reducible iron bearing material. In yet another alternative, the quantity of first carbonaceous reducing material may be of an amount between about 65 percent and about 75 percent of a stoichiometric amount necessary for complete iron reduction of the reducible iron bearing material. The quantity of second carbonaceous reducing material being of an amount between about 20 percent and about 50 percent of a stoichiometric amount necessary for complete iron reduction of the reducible iron bearing material.

The basicity $B_2$ of the reducible mixture may be between 1.5 and 2.3. Alternatively, the basicity $B_2$ of the reducible mixture is between 1.9 and 2.3.

The first carbonaceous reducing material may be of a size less than about 65 mesh. Alternatively, the first carbonaceous reducing material may be between about 65 mesh and about 100 mesh.

The second carbonaceous reducing material may be of a size between about 6 mesh and about 65 mesh. Alternatively, the second carbonaceous reducing material may be of a size between about 6 mesh and about 48 mesh.

The first carbonaceous reducing material may include at least two sources of carbonaceous material, at least one source being fines less than about 48 mesh from a source of carbonaceous material in the second carbonaceous reducing material.

The first carbonaceous reducing material may be a carbonaceous material with between 2 and 40% average volatiles, and the second carbonaceous reducing material may be a non-caking carbonaceous material with less than 10% average volatiles. Alternatively, the second reducing material may be a non-caking carbonaceous material with between 1 and 8% volatiles.

The reducible mixture may be formed into agglomerates. In one alternative, the second carbonaceous reducing material is of a size less than 20 mesh and the reducible mixture is formed into balls.

BRIEF DESCRIPTION OF THE DRAWINGS

The following detailed description of embodiments of the present method can be best understood when read in conjunction with the following drawings, where like structure is indicated with like reference numerals and in which:

FIG. 4 is a table of chemical compositions of one or more additives that may be used in one or more embodiments of the metallic iron nodule processes described herein, FIG. 5 is a table showing compositions of material samples used in forming a reducible mixture for making metallic iron nodules by the present method, FIG. 6 is a table showing proximate analysis of a high-volatile bituminous coal, FIG. 7 is a table of size distribution of mill scale as received prior to forming a reducible mixture, FIG. 8 is a table of compositions of the reducible mixtures of varying amounts of carbonaceous material for making metallic iron nodules by one embodiment of the present method, FIG. 9 is a table of compositions of the reducible mixtures of varying amounts of bimodal carbonaceous materials for making metallic iron nodules by an alternative embodiment of the present method, FIG. 10 is a table of compositions of the reducible mixtures of varying amounts of bimodal carbonaceous materials and varying basicity for making metallic iron nodules by an alternative embodiment of the present method, FIG. 13 is a table showing a partial sample of experimental test parameters producing metallic iron nodules using reducible mixtures of FIG. 10, FIG. 15 is a table of compositions of the reducible mixtures of varying amounts of bimodal carbonaceous materials and varying basicity for making metallic iron nodules by another alternative embodiment of the present method, FIGS. 16A and 16B are tables of compositions of the reducible mixtures including taconite and varying basicity for making metallic iron nodules by another alternative embodiment of the present method.

DETAILED DESCRIPTION OF THE DRAWINGS

Figure 1:
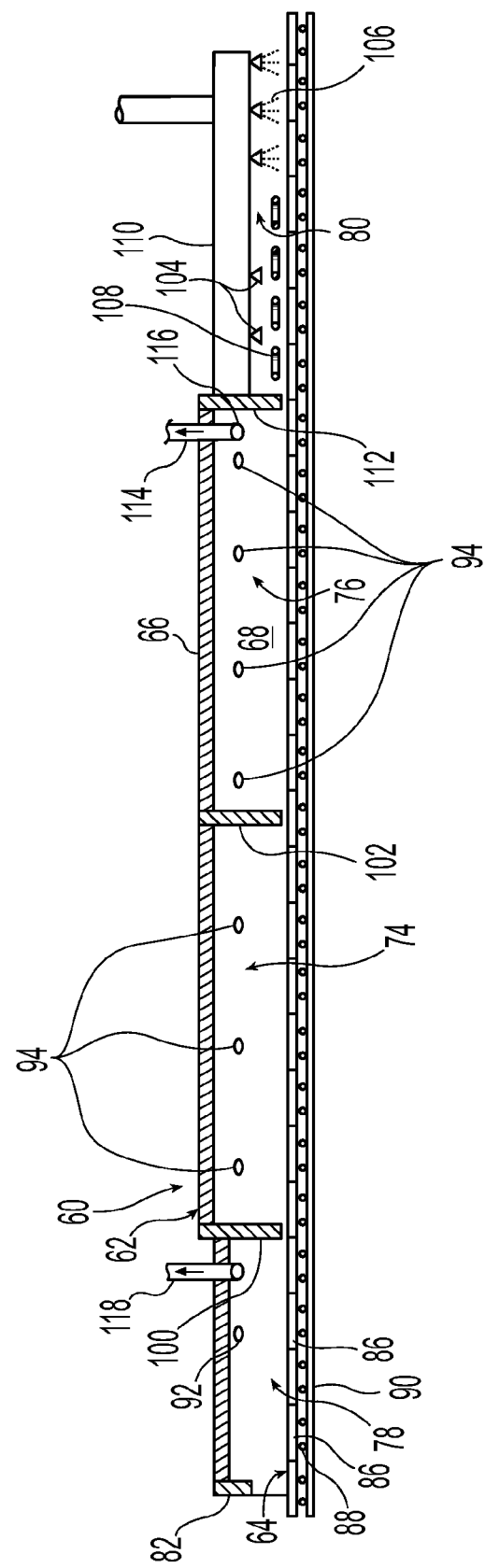
FIG. 1 is a cross sectional diagrammatical view showing a hearth furnace for producing metallic iron material.
Figure 2:
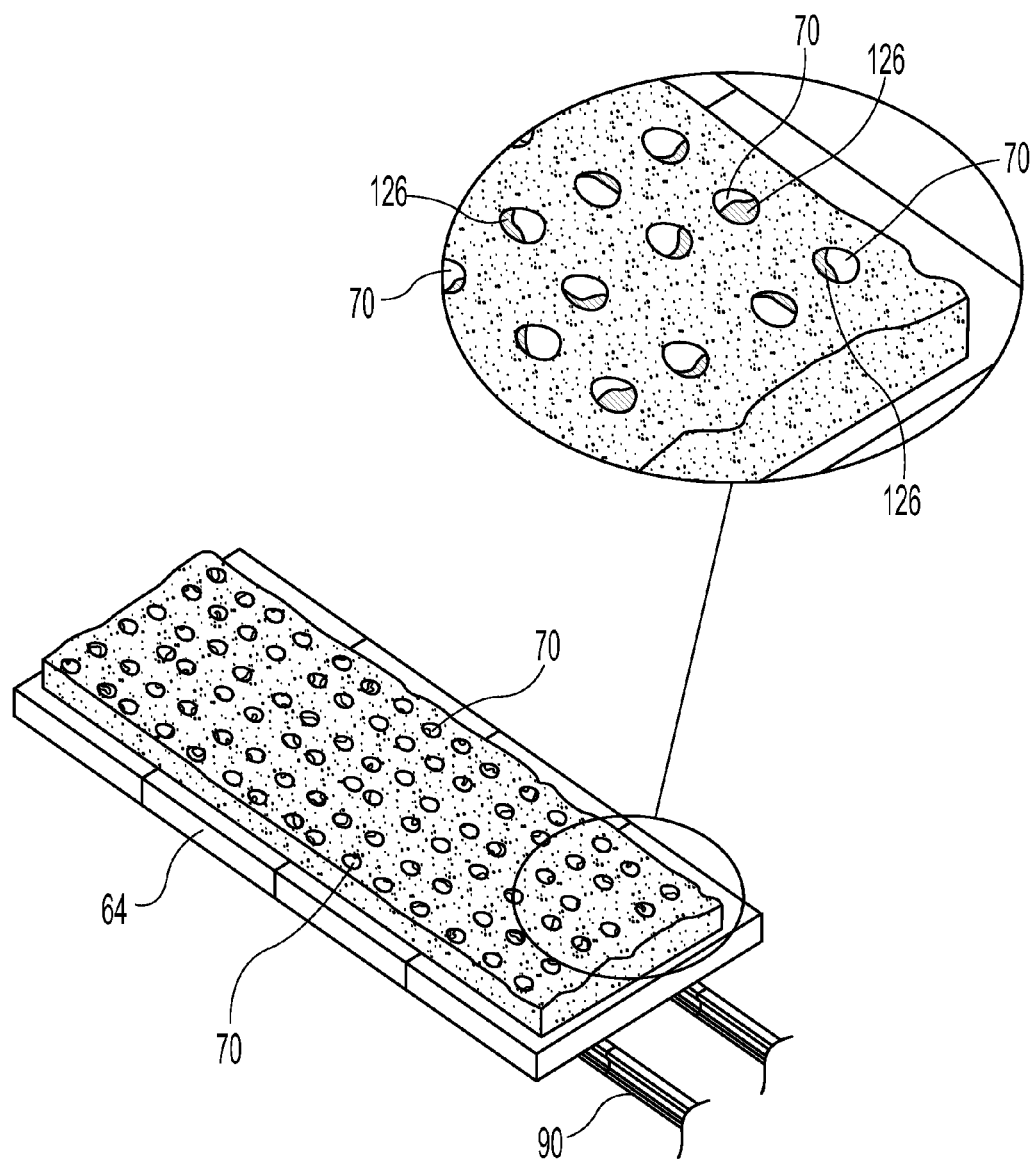
FIG. 2 is a generally top view showing metallic iron nodules above a hearth.
Figure 3:
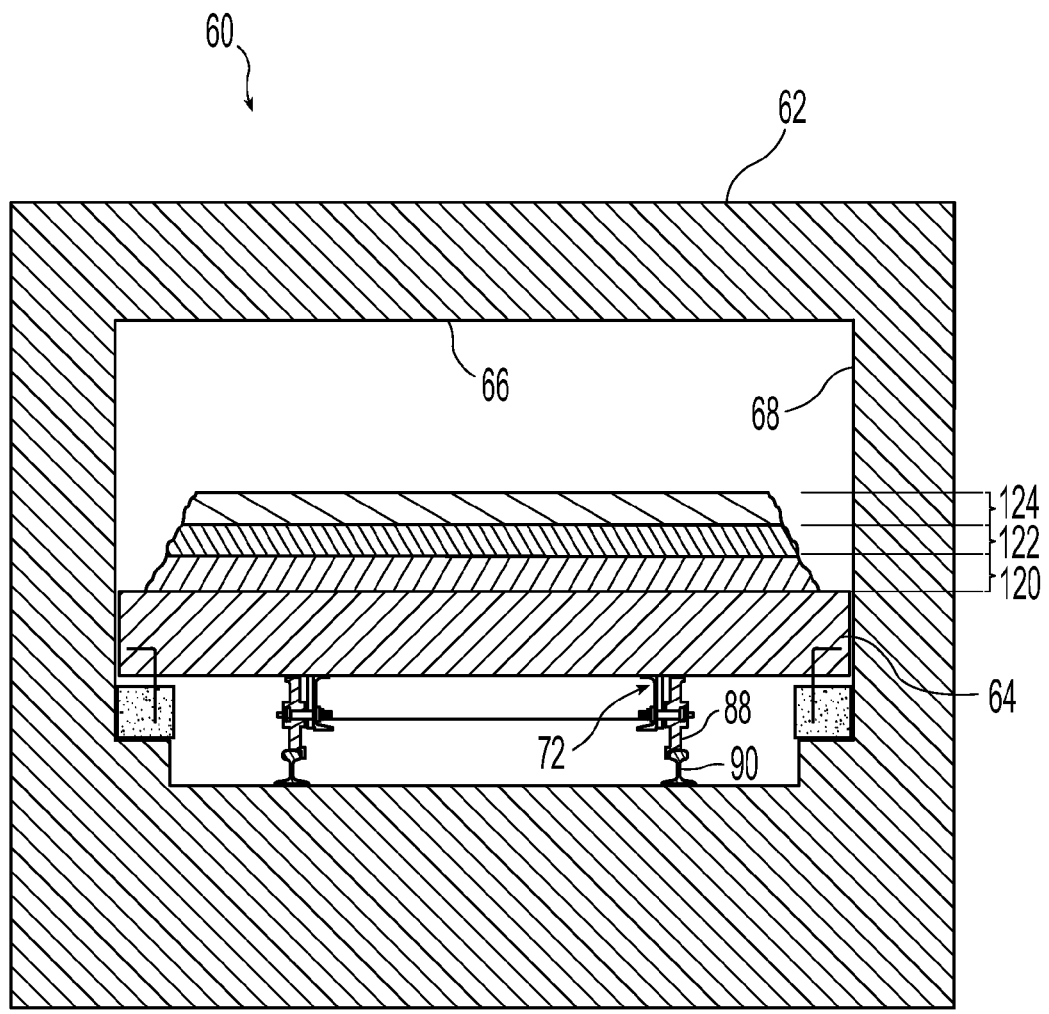
FIG. 3 is a generalized cross-sectional view showing a hearth and the layers thereon.

Referring now to FIGS. 1 through 3, a hearth furnace 60 for producing metallic iron material directly from iron ore and other iron oxide sources may include a furnace housing 62 and a hearth 64. The furnace housing 62 includes a furnace roof 66 and side walls 68 internally lined with a refractory material suitable to withstand the temperatures involved in the metallic reduction process carried out in the furnace. The hearth 64 may be any moving hearth suitable for use with the hearth furnace 60 operable for production of metallic iron nodules 70. Generally, the hearth 64 includes refractory material upon which a reducible mixture to be processed (e.g., feed material) is received. The hearth 64 may be a hearth suitable for use in a rotary hearth furnace, a linear hearth furnace (e.g., as shown in FIGS. 1 and 2), or any other furnace system operable for production of metallic iron nodules 70 (NRI).

The refractory material lining the interior of the furnace may be, for example, refractory board, refractory brick, ceramic brick, or a castable refractory material. More than one refractory material may be used in different locations as desired. For example, a combination of refractory board and refractory brick may be selected to provide additional thermal protection for any underlying substructure. The hearth 64 may include a supporting substructure 72 that moves the refractory material (e.g., a refractory lined hearth) forming hearth 64 through the furnace. The supporting substructure may be formed from one or more different materials, such as, for example, stainless steel, carbon steel, or other metals, alloys, or combinations thereof that have suitable high temperature characteristics for furnace operation.

The hearth furnace 60 may be divided into at least a conversion zone 74 capable of providing a reducing atmosphere for the reducible material, and a fusion zone 76 capable of providing an atmosphere to at least partially form metallic iron material. A drying/preheating zone 78 may be provided adjacent the furnace housing capable of providing a drying/preheating atmosphere for the reducible mixture. Additionally, a cooling zone 80 capable of providing a cooling atmosphere for reduced material containing metallic iron material may be provided in or adjacent the furnace housing immediately following the fusion zone 76. As noted, the cooling zone may be in the furnace housing 62, but as shown in FIG. 1, the cooling zone may be provided outside the furnace housing since the furnace housing is not necessary to its operation. Also as noted, the drying/heating zone 78 may be provided inside or outside the furnace housing in desired embodiments.

In any case, the conversion zone 74 is positioned between the drying/preheating zone 78 and the fusion zone 76 and is the zone in which volatiles from the reducible mixture, including carbonaceous material, are fluidized, as well as the zone in which at least the initial reduction of metallic iron material occurs. The entry end of the hearth furnace 60, at the drying/preheating zone 78, may be at least partially closed by a restricting baffle 82 that may inhibit fluid flow between the outside ambient atmosphere and the atmosphere of the drying/preheating zone 78, yet provide clearance so as not to inhibit the movement of reducible mixture into the furnace housing 62. The baffle 82 may be made of suitable refractory material such as silicon carbide or a metal material if the temperatures are sufficiently low. The atmosphere in the hearth furnace 60 is typically maintained at a positive pressure compared to the ambient atmosphere to further inhibit fluid flow from the ambient atmosphere to the hearth furnace. The method of producing metallic iron nodules may include reducing the reducible mixture in the hearth furnace 60 to metallic iron nodules substantially free of air ingress from the surrounding environment.

The hearth 64 provided within the furnace housing 62 may comprise a series of movable hearth cars 86 that are positioned contiguously end to end as they move through the furnace housing 62. Hearth cars 86 may be movable on wheels 88 that engage rails 90. The upper portion of the hearth cars 86 are lined with a refractory material suitable to withstand the temperatures for reduction of the iron oxide bearing material into metallic iron nodules as explained herein. The hearth cars are positioned contiguously end to end to form hearth 64 and move through the furnace housing 62, so that the lower portions of the hearth cars are not damaged by the heat generated in the furnace as reduction of the iron oxide-bearing material into metallic iron proceeds. Alternatively, the hearth 64 may be a movable belt or other suitable conveyance medium provided with refractory material for the temperatures of the furnace atmospheres.

The hearth furnace may be linear as generally illustrated in FIGS. 1 and 2. With a linear furnace, the building in which the furnace is housed, or other considerations, may require that certain parts of the furnace be arcuate or at angles, to accommodate these needs. For these purposes, the hearth furnace is classified as linear if a part of its length, usually the conversion zone 74 and/or fusion zone 76, is substantially linear in the direction of travel of the hearth 64. Alternatively, the hearth furnace may be rotary, in which case the hearth cars are pie-shaped or in the form of replaceable sections of a contiguous annular hearth rotatably supported in the furnace housing.

The zones of the furnace 60 are generally characterized by the temperature reached in each zone and the processing of the reducible mixture in each zone. In the drying/preheating zone, moisture is driven off from the reducible mixture and the material is heated to a temperature short of substantial fluidization of volatiles in and associated with the reducible mixture positioned on the hearth cars 86. The design is to reach in the drying/preheating atmosphere a temperature in the reducible mixture as high as reasonable for removing moisture and heating of the material, but below the temperature of substantial fluidization of the volatiles in the carbonaceous material in and associated with the reducible mixture. This temperature is generally in the range of about 200-400° F. (about 95-200° C.), and is selected usually depending in part on the particular composition of the reducible mixture and the particular composition of the carbonaceous material. One or more preheating burners 92 may be provided in the drying/preheating zone, for example, in the side walls of the furnace housing 62. The preheating burners 92 may be oxy-fuel burners or air/natural gas fired burners as desired, depending on the desired composition of the gas from the drying/preheating zone.

The conversion zone 74 is characterized by heating the reducible mixture to drive off remaining moisture and most of the remaining volatiles in the reducible mixture, and at least partially reduce the reducible material. The heating in the conversion zone 74 may initiate the reduction reaction in forming the reducible material into metallic iron nodules and slag. The conversion zone 74 is generally characterized by heating the reducible mixture to about 1800 to 2350° F. (about 980° C. to about 1290° C.), or higher, depending on the particular composition and form of reducible material of the particular embodiment.

The fusion zone 76 involves further heating the reducible mixture, now absent most volatile materials, to reduce and melt the iron bearing material, to form metallic iron nodules and slag. The melting temperature of the reduced iron is lowered as the amount of carbon in the iron increases by carburization. The fusion zone generally involves heating the reducible mixture to about 2400 to 2650° F. (about 1310-1450° C.), or higher, so that metallic iron nodules 70 are formed with a low percentage of iron oxide in the metallic iron. If the method is carried out efficiently, there will also be a low percentage of iron oxide in the slag, since the method is designed to reduce very high percentage of the iron oxide in the reducible mixture to metallic iron nodules.

Burners 94 may be provided in the side wall 68 of the furnace housing 62 such as shown in FIG. 1 for heating the reducible mixture in the conversion zone 74 and fusion zone 76. Alternatively or in addition, the burners may be positioned in the roof 66 of the furnace housing 62. The burners 94 are positioned to provide for efficient combustion of the fluidized volatile materials in the conversion zone and to efficiently reduce the reducible material to NRI in the fusion zone 76. The burners 94 should be positioned to provide for efficient heat transfer and efficient reduction of the iron oxide in the reducible mixture with the least energy consumption. The burners 94 may be positioned on about 10 foot centers (about 3 m), staggered along opposite side walls 68, about a foot down from the roof 66 of the furnace housing 62. Alternatively, or in addition, the burners may be positioned opposite each other in the side walls 68 and/or in the roof 66 of the furnace housing 62. The burners 94 may be oxy-fuel burners. Alternatively, the burners 94 may be air-fuel burners.

Alternatively, the heating may be carried out in any suitable manner at any suitable temperature. It will be understood that the heating is generally carried out in such a manner as to cause fusion or melting of the metallic iron produced by the process in the fusion zone. For example, the heating may be carried out in an atmosphere using a linear or rotary furnace wherein the conversion zone comprises more than one zone. In the experimental data presented in FIG. 13 described below, the linear hearth furnace included a first heating zone, or zone 1, wherein the temperature of the reducible mixture is raised and some reduction of the reducible material occurs, and a second heating zone, or zone 2, where further reduction occurs but where the temperature does not exceed the melting point of iron. The fusion zone, or zone 3 in the data of FIG. 13, immediately follows the conversion zone and includes temperatures where fusion of the reducible material of the heated reducible mixture may occur. Alternatively, the fusion zone 76 may comprise more than one zone. It will be understood however that the heating may occur in any suitable heating atmosphere at any suitable temperature. In the above example, the first heating zone may have a temperature of up to about 2200° F. (about 1200° C.), the second heating zone may have a temperature up to about 2400° F. (about 1315° C.), and the fusion zone may have a temperature up to about 2650° F. (about 1450° C.).

A first baffle 100 may be provided between the drying/preheating zone 78 and the conversion zone 74. The first baffle 100 is capable of inhibiting direct fluid communication between the atmosphere of the conversion zone 74 and the atmosphere of the drying/preheating zone 78. The first baffle 100 may be made of a suitable refractory material, such as silicon carbide, and may extend downwardly to within a few inches of the reducible mixture on the hearth 64. The design is to provide for efficient inhibiting of the direct fluids communication between the conversion zone 74 and the drying/preheating zone 78 in the furnace 60, without interfering with movement of reducible mixture on hearth 64 through furnace housing 62.

Optionally, a second baffle 102, such as shown in FIG. 1, may be provided either between the conversion zone 74 and the fusion zone 76 or part way into the fusion zone 76. The second baffle 102 is capable of inhibiting direct fluid communication between the atmosphere of the fusion zone 76 and the atmosphere of the conversion zone 74 where desired. The second baffle 102 may be a refractory material, such as silicon carbide, and extend to within a few inches of the heated reducible mixture positioned on the hearth 64 as it moves through the furnace housing 62, to effectively inhibit the direct fluid communication across the second baffle 102.

The cooling zone 80 provides cooling to reduce the temperature of the metallic iron material 70 from its formation temperature in the conversion zone 74 and fusion zone 76 to a temperature at which the metallic iron material can be reasonably handled and further processed. This temperature after cooling is generally below 800° F. (about 425° C.) and may be below about 500° F. (about 260° C.) or below. The cooling can be achieved by injection of nitrogen or carbon dioxide through nozzles 104 in the roofs and/or side walls of the furnace housing 62 or external the furnace housing 62. As to the latter, water spray 106 may be used external the furnace housing 62 for the cooling in the cooling zone 80, if desired and provision made for water handling within the system. Alternatively or additionally, a system of coolant tubes 108 may be positioned over the moving hearth 64 as shown in FIG. 1. A vent hood 110 may be positioned above the moving hearth 64 to remove evaporated water and other fluidized materials that come off of the hearth during the spray cooling.

The cooling zone 80 is optionally in the furnace housing 62. However, it is more desirable in certain embodiments to perform the cooling of the metallic iron material outside the furnace housing 62, such as shown in FIG. 1, to reduce furnace costs, provide for more efficient cooling, and maintenance and handling considerations.

The exit end of the hearth furnace 60, at the cooling zone 80, may be at least partially closed by a restricting baffle 112 that inhibits fluid flow between the atmosphere of the fusion zone 76 and the atmosphere of the cooling zone 80, yet provides clearance so as not to inhibit the movement of the heated reducible mixture out the furnace housing 62. The baffle 112 may be made of a suitable refractory material, such as silicon carbide, and may extend to within a few inches of the heated reducible mixture positioned on the hearth 64 as the heated reducible mixture moves through the furnace housing 62.

An exhaust gas system may include an exhaust stack 114 having an inlet 116 provided in the conversion zone 74 and/or fusion zone 76. FIG. 1 shows the exhaust stack 114, for example, in the fusion zone. Alternatively, the exhaust stack 114 may be positioned in or adjacent the conversion zone 74 to enable combustion of volatile matter fluidized in the conversion zone prior to exiting the furnace. The exhaust gas system may have a variable flue damper, not shown. An in-line damper or pressure control may be provided to control the flue gas stream and improve zone pressure control. The exhaust gas system may include a thermal oxidizer to process the flue gas. Optionally, the flue gas may be directed to a heat recovery system or other downstream processing. The drying/preheating zone may include a drying zone exhaust stack 118 provided to remove moisture and other fluids from the drying/preheating zone 78. The drying zone exhaust stack 118 may direct the flow from the drying/preheating atmosphere to combine with the stack gas through exhaust stack 114 into an exhaust gas system. Alternately, the flow from the drying/preheating zone 78 may be directed to a scrubber, baghouse filter, or other exhaust processing separate from the exhaust gas system.

With reference to FIG. 3, the preparation of the reducible mixture of iron bearing material and carbonaceous material for processing by the hearth furnace is illustrated. A hearth material layer 120 may be provided on hearth 64 that includes at least one carbonaceous material. The carbonaceous material may be any carbon-containing material suitable for use as a reductant with the iron-bearing material. The hearth material layer 120 includes coke, char, or other carbonaceous material, or mixtures thereof. For example, anthracite coal, bituminous coal, sub-bituminous coal, coke, coke breeze or char materials may be used for the hearth material layer 120. We have found that certain bituminous (e.g. high and medium-volatile bituminous) and sub-bituminous coals may be used in mixtures with anthracite coal, coke, coke breeze, graphite, or char materials.

The hearth material layer 120 may comprise a mixture of finely divided coal and a material selected from the group of coke, char, and other carbonaceous material found to be beneficial to increase the efficiency of iron reduction. The coal particles may be a mixture of different coals such as non-coking coal, or non-caking coal, sub-bituminous coal, or lignite. The hearth material layer 120 may, for example, include sub-bituminous coal and/or char. Additionally, although up to one hundred percent coal is contemplated for use as a hearth material layer, in some embodiments the finely divided coal may comprise up to twenty-five percent (25%) and mixed with coke, char, anthracite coal, or other low-volatile carbonaceous material, or mixtures thereof. In other embodiments, up to fifty percent (50%) of the hearth material layer may comprise coal, or up to seventy-five percent (75%) of the hearth material layer may comprise coal, with the remaining portion coke, char, other low-volatile carbonaceous material, or mixtures thereof. The balance will usually be determined by the amount of volatiles desired in the reduction process and the furnace.

The hearth material layer 120 may comprise two or more layers of carbonaceous materials as desired. The hearth material layer 120 may include a first layer of undevolutized coal and a second layer of coke or char above the first layer of coal. For example, the hearth material layer 120 may include a first layer of sub-bituminous coal, and a second layer of char material over the coal layer. The char material may be devolatilized carbonaceous material removed from the hearth at the exit end of the furnace and recycled in the hearth material layer 120 or used as recycled char for the reducing material in the briquettes as discussed below. The layer of char or coke over the layer of devolatilized coal slows and extends the fluidization of volatiles from the coal as the hearth cars 86 move through the conversion zone 74 to later stages in the reduction reaction.

The hearth material layer 120 may be of a thickness sufficient to prevent slag from penetrating the hearth material layer 120 and contacting refractory material of hearth 64. For example, the carbonaceous material may be ground or pulverized to an extent such that it is fine enough to prevent the slag from such penetration, but typically not so fine as to create excess ash. As recognized by one skilled in the art, contact of slag with the hearth 64 during the metallic iron nodule process may produce undesirable damage to the refractory material of hearth 64. A suitable particle size for the carbonaceous material of the hearth layer is less than 4 mesh and desirably between 4 and 100 mesh, with a reasonable hearth layer thickness of about ½ inch or more, is effective protection for the hearth 64 from penetration of the slag and metallic iron during processing. Carbonaceous material less than 100 mesh may be avoided because generally high in ash and resulting in entrained dust that is difficult to handle in commercial operations. The mesh size of discrete particles is measured by Tyler Mesh Size for the measurements given herein.

In some applications, the hearth material layer 120 may be of sufficient thickness to reduce contact adhesion of the iron and slag with the refractory, such as thickness less than ½ inch. In one example, the hearth material layer 120 thickness may be less than 1/16 inch.

The reducible mixture 122 is positioned over the hearth cars 86 above at least a portion of the hearth material layer, typically prior to entering the furnace. The reducible mixture 122 is generally in the form of a mixture of finely divided iron ore or other iron oxide bearing reducible material, and a carbonaceous reducing material, such as coke, char, anthracite coal or non-caking bituminous and sub-bituminous coal.

The method of producing metallic iron nodules may include providing the layer of reducible mixture 122 on the underlying hearth material layer 120 as further shown in FIG. 3. The layer of reducible mixture includes at least a reducible iron-bearing material and reducing material for the production of iron metal nodules and slag. As used herein, iron-bearing material and reducible material includes any material capable of being formed into metallic iron nodules and slag by the described metallic iron nodule process. The iron-bearing material may include iron oxide material, iron ore concentrate, taconite pellets, recyclable iron-bearing material, pellet plant wastes and pellet screened fines. Further, such pellet plant wastes and pellet screened fines may include a substantial quantity of hematite. In addition, such iron-bearing material may include magnetite concentrates, oxidized iron ores, steel plant wastes (e.g., blast furnace dust, basic oxygen furnace (BOF) dust and mill scale), red mud from bauxite processing, titanium-bearing iron sands and ilmenites, manganiferous iron ores, alumina plant wastes, or nickel-bearing oxidic iron ores. Also, less expensive iron ores high in silica may be used. Other reducible iron bearing materials may also be used for making the reducible mixture for producing metallic iron nodules used in the processes described herein to produce metallic iron nodules. For example, nickel-bearing laterites and garnierite ores for ferronickel nodules, or titanium bearing iron oxides such as ilmenite that can be made into metallic titanium iron nodules (while producing a titania rich slag).

The iron-bearing material may include recycled micro metallic iron nodules formed in the process of producing metallic iron nodules. Micro metallic iron nodules (called micro-nodules or micro NRI) include small particles of agglomerated iron having a size between about 20 mesh and about 3 mesh as discussed above. Metallic iron nodules less than 20 mesh can also be used depending on the availability of separation and handling systems to recycle micro nodules.

In one alternative, the reducible mixture may contain mill scale containing more than 55% by weight FeO and FeO equivalent, such as disclosed in International Patent Application PCT/US2010/021790, filed Jan. 22, 2010, and incorporated herein by reference.

The iron-bearing reducible material may be finely-ground or otherwise physically reduced in particle size. As an example, the size distribution of mill scale before reducing particle size is shown in FIG. 7. The particle size of the mill scale or mixture of mill scale and similar metallurgical waste may be at least 80% less than 10 mesh. Alternatively, the iron-bearing metallurgical waste may be of a particle size of at least 80% less than 76 mesh. In one alternative, the iron-bearing material may be ground to less than 65 mesh (i.e., −65 mesh) or less than 100 mesh (i.e., −100 mesh) in size for processing according to the disclosed method of making metallic iron nodules. Larger size particles, however, of iron-bearing material may also be used. For example, pellet screened fines and pellet plant wastes are generally approximately 3 mesh (about 0.25 inches) in average size. Such material may be used directly, or may be reduced in particle size to increase surface contact of carbonaceous reductant with the iron bearing material during processing. A smaller particle size tends to reduce fusion time in the present method as further discussed below.

Various carbonaceous materials may be used in providing the reducible mixture 122 of reducing material and iron-bearing reducible material. The reducing material may contain at least a material selected from the group consisting of anthracite coal, coke, char, bituminous coal and sub-bituminous coal (including various grades of medium-volatile and high-volatile bituminous coals), or combinations thereof. For example, eastern anthracite coal and bituminous non-caking coals may be used as the carbonaceous reductant in at least one embodiment. However, in some geographical regions, such as on the Iron Range in Northern Minnesota, the use of western sub-bituminous non-caking coal offers an attractive alternative, as such coals are more readily accessible with the rail transportation systems already in place, plus they are generally lower in cost and lower in sulfur levels. As such, western sub-bituminous coals may be used in one or more embodiments of the present method as described herein. Alternatively, or in addition, the sub-bituminous coals may be carbonized, such as up to about 1650° F. (about 900° C.), prior to its use. The high-volatile bituminous coal used for reducing material as described below has a proximate analysis shown in FIG. 6. In any case, the carbonaceous material in the reducible mixture may contain an amount of sulfur in a range from about 0.2% to about 1.5%, and more typically, in the range of 0.5% to 0.9%.

Optionally, the present method for producing metallic iron nodules may include delivering a coarse carbonaceous material, shown in FIG. 3 as carbonaceous material 124, having particle greater than 6 or 4 mesh, such as between 6 or 4 mesh and ½ inch, over the reducible mixture. In certain applications, the optional coarse carbonaceous material 124 may assist in fusion, reduce sulfur in the NRI, and inhibit reoxidation of the reduced material in forming metallic iron nodules, such as disclosed in U.S. patent application Ser. No. 12/359,729, filed Jan. 26, 2009, and U.S. patent application Ser. No. 12/569,176, filed Sep. 29, 2009. We have found, however, under certain conditions a carbonaceous overlayer may increase fusion time. The present method provides production of the metallic iron nodules 70 with reduced residence time in the furnace without using a cover layer.

If desired, the optional coarse carbonaceous material 124 may be delivered in a layer over at least some of the reducible mixture 122 as shown in FIG. 3. The coarse carbonaceous material of the overlayer may have an average particle size greater than an average particle size of the hearth layer and greater than 6 mesh in particle size. In addition or alternatively, the overlayer of coarse carbonaceous material may include discrete particles having a size greater than 4 mesh and in some embodiments, the overlayer of coarse carbonaceous material may have discrete particles with a size between 4 mesh or 6 mesh and about ½ inch (about 12.7 mm). There may be of course some particles in the coarse carbonaceous material less than 4 mesh or 6 mesh in size in commercially made products, but in this application the substantial majority of the discrete particles will be greater than 4 mesh or 6 mesh when a coarse carbonaceous material of particle size greater than 4 mesh or 6 mesh is desired. Finer particles of carbonaceous material that may be present in some commercially available compositions are tolerated but not desired. The optional coarse carbonaceous material 124 may be selected from the group consisting of anthracite coal, bituminous coal, sub-bituminous coal, coke, char, and mixtures of two or more thereof.

We have found that the amount and size of reducing material in the reducible mixture 122, the internal carbon, may be varied to effect the fusion time of the reducible material, the amount of micro-nodules (micro NRI) and amount of sulfur in the metallic iron nodules. To reduce the generation of micro-nodules, and to accelerate carburization of the reduced iron before fusion, the reducing material in the reducible mixture may have a bimodal size distribution including an amount of fine carbonaceous material useful in the reduction of the reducible material and an amount of coarse carbonaceous material useful in carburizing the reduced iron.

The portion of fine carbonaceous material may be a quantity of first carbonaceous reducing material of a size less than about 48 mesh of an amount between about 60% and about 95% of a stoichiometric amount necessary for complete iron reduction of the reducible iron bearing material (i.e. between about 60% and about 95% stoichiometric). The portion of coarse carbonaceous material may be a quantity of second carbonaceous reducing material with an average particle size greater than average particle size of the first carbonaceous reducing material and a size between about 3 mesh and about 48 mesh of an amount between about 20 percent and about 60 percent of a stoichiometric amount of necessary for complete iron reduction of the reducible iron bearing material (i.e. between about 20% and about 60% stoichiometric).

When the reducing material in the reducible mixture includes only fine carbonaceous material, such about −65 mesh, −100 mesh, −200 mesh or combinations thereof, increasing the amount of carbonaceous material beyond about 95% of the stoichiometric amount increased the generation of micro-nodules as shown by the experimental test data in TABLE 1. We have also found that providing only a coarser carbonaceous material with normal size distribution slowed the formation of NRI.

TABLE 1

| −200 mesh coal[1] % stoich. | Mix No. | Fusion time, (min) | Micro NRI (%) | NRI % C | NRI % S |
|---|---|---|---|---|---|
| 115 | P-758 | 4 | 9.9 | 2.30 | 0.031 |
| 105 | P-757 | 4 | 6.5 | 2.32 | 0.032 |
| 100 | P-790 | 5 | 1.2 | 2.27 | 0.042 |
| 95 | P-756 | 7 | 0.9 | 2.23 | 0.063 |
| 90 | P-789 | 7 | 0.1 | 2.80 | 0.053 |
| 85 | P-752 | 8 | 0.9 | 2.80 | 0.054 |
| 80 | P-788 | 14 | 0.2 | 2.83 | 0.094 |
| 75 | P-752 | 14 | 0.9 | 2.59 | 0.103 |

TABLE 1-continued

| −200 mesh coal[1] % stoich. | Mix No. | Fusion time, (min) | Micro NRI (%) | NRI % C | NRI % S |
|---|---|---|---|---|---|
| 80 | P-788 | 13 | 0.5 | 2.86 | 0.067 |
| 75 | P-787 | 15 | 0.6 | 2.52 | 0.096 |
| 70 | P-857 | >20 | —[2] | — | — |

[1]High-volatile bituminous coal.
[2]Not fused.

Table 1 is a summary of the effects of the reducible mixture having different amounts of high-volatile bituminous coal at −200 mesh, with 2% fluorspar and a slag composition for basicity $B_2$ of 1.5, briquetted with 4% molasses as a binder, placed on 6/100 mesh anthracite char hearth layer, and heated at 1400° C. (2552° F.) for different periods of time in a box furnace $N_2$—CO atmosphere. The compositions of the reducible mixtures used in Table 1 are shown in FIG. 8. The composition of the mill scale is shown in FIG. 5, and size distribution as received shown in FIG. 7. As used herein, basicity $B_2$ is the ratio of $CaO/SiO_2$, and basicity $B_4$ is the ratio of $CaO+MgO/SiO_2+Al_2O_3$.

When the reducing material in the reducible mixture includes a bimodal size distribution, the fusion time may be reduced. Table 2 is a summary of preliminary tests in the box furnace using bimodal size distribution of carbonaceous material in the reducible mixture. The reducible material in the mixture was mill scale. The test of Table 2 includes a varied amount of anthracite char recycled from a prior heating in making NRI or DRI (recycled anthracite) having a size of 6/28 mesh with 85% of the stoichiometric amount of high-volatile bituminous coal at −200 mesh. The reducible mixture included 2% fluorspar and a slag composition for basicity $B_2$ of 1.5. As shown by Table 2, the bimodal distribution of carbonaceous material in the reducible mixture reduced the fusion time by about 50% without significantly increasing the generation of micro-nodules. The amount of sulfur in the NRI produced was also lowered.

TABLE 2

| Recycled anthracite 6/28 mesh (% stoichiometric) | Fusion time at 1400° C. (min) | Micro NRI (%) | NRI % S |
|---|---|---|---|
| 0 | 8 | 1.8 | 0.093 |
| 40 | 4 | 1.4 | 0.053 |
| 50 | 4 | 3.4 | 0.056 |
| 60 | 4 | 1.4 | 0.060 |

The effect of using bimodal size distribution was tested in a linear hearth furnace providing results summarized in Table 3 with mill scale as the reducible material. The test of Table 3 includes a varied amount of anthracite char recycled from a prior heating in an NRI process (recycled anthracite) having a size of 6/28 mesh with 85% of the stoichiometric amount of high-volatile bituminous coal at −200 mesh. The reducible mixture included 2% fluorspar and a slag composition for basicity $B_2$ of 1.5. Additionally, in the test of Table 3 a cover layer was provided over the reducible mixture using 1.5 lb/ft² of anthracite.

TABLE 3

| Recycled anthracite 6/28 mesh (% stoichiometric) | Fusion time at 1400° C. (min) | % Fused | Micro NRI (%) | NRI % S |
|---|---|---|---|---|
| 0 | 70 | 100 | 3.3 | 0.107 |
| 40 | 51 | 100 | — | — |
|  | 56 | 100 | 7.6 | 0.082 |
| 50 | 56 | 100 | 8.5 | 0.068 |
|  | 51 | 95 | — | — |
| 60 | 51 | 100 | — | — |
|  | 51 | 100 | 14.6 | 0.065 |

The first carbonaceous reducing material and second carbonaceous reducing material provide total amount of carbonaceous reducing material in the reducible mixture, or total reducing material carbon that may be between about 100% and 150% of the stoichiometric amount of necessary for complete iron reduction of the reducible iron bearing material. Alternatively, the first carbonaceous reducing material and second carbonaceous reducing material provide total reducing material carbon between about 110 and 140 percent of a stoichiometric amount. As shown by the experimental data in Table 4 below, fusion time in a box furnace for different relative amounts of high-volatile bituminous coal and recycled anthracite remained nearly the same within the total carbon in the reducible mixture of 115%, as well as within 125% of the stoichiometric amount. In the experiment for Table 4, the fusion time at 125% of the stoichiometric amount was typically 4 minutes, which was somewhat shorter than at 115% of the stoichiometric amount at 5 minutes. As compared to 85% stoichiometric high-volatile bituminous coal by itself from Table 1, fusion time decreased by as much as 50% when the 6/28 mesh recycled anthracite was added without significantly increasing the amount of micro-nodules produced. Additionally, 115% stoichiometric coal by itself from Table 1 also provided a fusion time of 4 minutes, but generated about 10% micro-nodules. By providing a bimodal size distribution, the amount of micro-nodules may be reduced.

TABLE 4

| Coal$^{(1)}$ + Recyc. Anthracite (% stoich.) | Mix No. | Fusion Time (min) | Micro NRI (%) | NRI % C | NRI % S |
|---|---|---|---|---|---|
| Total Carbon 115% Stoich: |  |  |  |  |  |
| 70% + 45% | P-786 | 5 | 0.3 | 2.56 | 0.051 |
| 75% + 40% | P-775 | 4 | 0.3 | 2.50 | 0.046 |
| 80% + 35% | P-777 | 5 | 0.0 | 2.18 | 0.052 |
| 85% + 30% | P-763 | 5 | 1.3 | 2.49 | 0.051 |
| 90% + 25% | P-779 | 5 | 0.2 | 2.33 | 0.043 |
| 95% + 20% | P-766 | 5 | 3.9 | 2.42 | 0.048 |
| Total Carbon 125% Stoich: |  |  |  |  |  |
| 75% + 50% | P-783 | 4 | 0.8 | 2.65 | 0.047 |
| 80% + 45% | P-784 | 5 | 0.2 | 2.46 | 0.049 |
| 85% + 40% | P-781 | 4 | 0.7 | 2.47 | 0.035 |
| 90% + 35% | P-785 | 4 | 0.2 | 2.37 | 0.042 |

$^{(1)}$High-volatile bituminous coal.

The compositions of the reducible mixtures used in Table 4 are shown in FIG. 9. In the test for Table 4, the reducible material was mill scale. The high-volatile bituminous coal was sized to −200 mesh, and the recycled anthracite was 6/28 mesh. The reducible mixture included 2% fluorspar and a slag composition for basicity $B_2$ of 1.5, briquetted with 4% molasses as a binder, placed on 6/100 mesh anthracite char hearth layer, and heated at 1400° C. (2552° F.) for different periods of time in a box furnace $N_2$—CO atmosphere.

Referring now to Tables 5 and 6, experimental data from initial tests collected in a test linear hearth furnace are provided. The compositions of the reducible mixtures used in Tables 5 and 6 are shown in FIG. 10. The test of Tables 5 and 6 was performed without a carbonaceous cover layer, providing residence times in the furnace as low as 18 minutes. In a prior test in the linear hearth furnace with high-volatile bituminous coal alone and a carbonaceous overlayer, the residence time in the furnace was as high as 70 seconds. By using a bimodal size distribution, the rate of production may be increased without significantly increasing the generation of micro-nodules.

TABLE 5

| Mix No. | Coal$^{(1)}$ % stoich | Recy. Anth. % stoich | Slag Basicity $B_2$ | Slag Basicity $B_4$ | Speed setting ("/min) | Residence (min) | Micro NRI | NRI % C | NRI % S |
|---|---|---|---|---|---|---|---|---|---|
| P-831 | 85 | 30 | 1.50 | 1.29 | 7 | (40)$^{(2)}$ | little | 2.03 | 0.186 |
| P-832 | 85 | 40 | 1.50 | 1.28 | 7 | (40) | little | 2.29 | 0.158 |
| P-833 | 85 | 50 | 1.50 | 1.27 | 7 | (40) | little | 2.22 | 0.136 |
| P-834 | 85 | 60 | 1.50 | 1.25 | 7 | (40) | little | 2.17 | 0.136 |
| P-903 | 95 | 40 | 1.50 | 1.27 | 8 | (35) | little | 2.37 | 0.158 |
| P-904 | 105 | 40 | 1.50 | 1.26 | 9 | (31) | some | 2.43 | 0.118 |
| P-905 | 115 | 40 | 1.50 | 1.26 | 9 | (31) | much | 2.36 | 0.098 |
| P-906 | 125 | 40 | 1.50 | 1.25 | 9 | (31) | much | 2.20 | 0.123 |
| P-900 | 100 | 40 | 1.50 | 1.27 | 7 | (40) | some | 2.27 | 0.147 |
| P-902 | 100 | 60 | 1.50 | 1.24 | 8 | (35) | some | 2.70 | 0.115 |
| P-919 | 100 | 80 | 1.50 | 1.24 | 9 | (31) | some | 2.51 | 0.100 |
| P-920 | 100 | 100 | 1.50 | 1.22 | 9 | (31) | some | 2.28 | 0.118 |
| P-935 | 100 | 40 | 1.70 | 1.42 | 12 | 27$^{(3)}$ | some | 2.60 | 0.110 |
| P-936 | 100 | 40 | 1.90 | 1.57 | 12 | 27 | some | 2.88 | 0.079 |
| P-937 | 100 | 60 | 1.70 | 1.39 | 12 | 27 | some | 2.67 | 0.090 |
| P-938 | 100 | 60 | 1.90 | 1.54 | 12 | 27 | some | 2.99 | 0.074 |
| P-929 | 90 | 40 | 1.50 | 1.27 | 12 | 30 | little | 2.54 | 0.133 |
| P-930 | 90 | 50 | 1.50 | 1.26 | 12 | 30 | little | 2.40 | 0.140 |
| P-931 | 90 | 60 | 1.50 | 1.25 | 12 | 30 | little | 2.52 | 0.146 |
| P-932 | 90 | 70 | 1.50 | 1.24 | 12 | 30 | little | 2.54 | 0.146 |
| P-939 | 90 | 40 | 1.70 | 1.43 | 10 | 32 | little | 2.24 | 0.130 |
| P-940 | 90 | 40 | 1.90 | 1.58 | 10 | 32 | little | 2.67 | 0.099 |

TABLE 5-continued

| Mix No. | Coal[1] % stoich | Recy. Anth. % stoich | Slag Basicity $B_2$ | $B_4$ | Speed setting ("/min) | Residence (min) | Micro NRI | NRI % C | % S |
|---|---|---|---|---|---|---|---|---|---|
| P-941 | 90 | 60 | 1.70 | 1.40 | 10 | 32 | little | 2.37 | 0.132 |
| P-942 | 90 | 60 | 1.90 | 1.55 | 10 | 32 | little | 2.72 | 0.090 |

[1]High-volatile bituminous coal.
[2]Fusion time was not reached at these settings.
[3]Actual timer reading at fusion time

TABLE 6

| Mix No. | Coal[1] % stoich | Recy. Anth. % stoich | Slag Basicity $B_2$ | $B_4$ | Speed setting ("/min) | Residence (min) | Micro NRI | NRI % C | % S |
|---|---|---|---|---|---|---|---|---|---|
| P-951 | 100 | 40 | 2.10 | 1.72 | 12 | 22.5[3] | some | 2.70 | 0.070 |
| P-952 | 100 | 40 | 2.30 | 1.88 | 16 | 19 | some | 3.11 | 0.045 |
| P-953 | 100 | 60 | 2.10 | 1.69 | 12 | 22.5 | some | 3.06 | 0.050 |
| P-954 | 100 | 60 | 2.30 | 1.84 | 18 | 18.5 | some | 3.25 | 0.039 |
| P-947 | 110 | 40 | 1.70 | 1.41 | 12 | 24.5 | more | 3.52 | 0.090 |
| P-948 | 110 | 40 | 1.90 | 1.57 | 14 | 22.5 | more | 2.43 | 0.080 |
| P-949 | 110 | 60 | 1.70 | 1.38 | 12 | 24.5 | more | 2.74 | 0.088 |
| P-950 | 110 | 60 | 1.90 | 1.53 | 14 | 22.5 | more | 2.69 | 0.067 |
| P-955 | 100 | 40[2] | 1.90 | 1.57 | 14 | 21 | little | 2.89 | 0.066 |
| P-956 | 100 | 40[2] | 2.10 | 1.72 | 16 | 19 | little | 3.22 | 0.044 |
| P-957 | 100 | 60[2] | 1.90 | 1.54 | 18 | 18 | little | 2.90 | 0.056 |
| P-958 | 100 | 60[2] | 2.10 | 1.69 | 18 | 18 | little | 3.08 | 0.039 |
| P-959 | 100 | 40 | 2.50 | 2.03 | 16 | 19.5 | little | 3.23 | 0.035 |
| P-960 | 100 | 40 | 2.70 | 2.19 | 16 | 19.5 | little | 3.55 | 0.030 |
| P-961 | 100 | 60 | 2.50 | 1.99 | 14 | 20 | little | 3.78 | 0.029 |
| P-962 | 100 | 60 | 2.70 | 2.15 | 14 | 20 | little | 3.69 | 0.027 |

Figure 11:
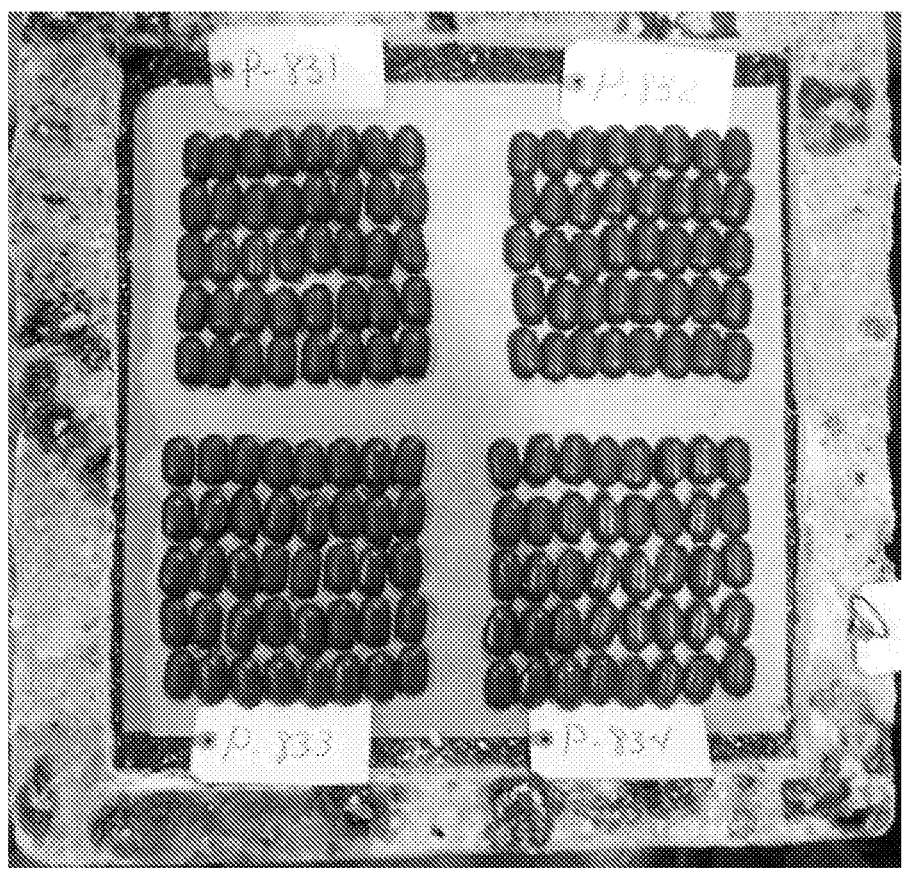
FIG. 11 is an image of various reducible mixtures prepared for making metallic iron nodules by the present method.
Figure 12:
FIG. 12 is an image of the various reducible mixtures of FIG. 11 after undergoing heating by the present method to form metallic iron nodules.

[1]High-volatile bituminous coal.
[2]Fluorspar increased to 4%.
[3]Actual timer reading at fusion time As an example, FIG. 11 shows test samples from Table 5 prior to heating. In the upper left quadrant are samples of P-831 having 30% recycled anthracite. The upper right has samples of P-832 having 40% recycled anthracite. In the lower left are samples of P-833 having 50% recycled anthracite, and the lower right has samples of P-834 having 60% recycled anthracite. FIG. 12 shows the test sample of FIG. 11 after heating with few micro-nodules present.

As shown in Tables 5 and 6, increasing the slag basicity $B_2$ to greater than about 2.1 may increase the rate of fusion reaction and decrease NRI sulfur. In the present method, the basicity $B_2$ may be between about 1.5 and 2.7, and basicity $B_4$ may be between about 1.2 and 2.2. In one application, the reducible mixture may include 100% stoichiometric high-volatile bituminous coal at –100 mesh and 60% stoichiometric recycled anthracite at 6/28 mesh, with a slag composition for basicity $B_2$ of higher than about 2.3 and $B_4$ higher than about 1.8. A partial sample of experimental test parameters used in the test for Tables 5 and 6 is shown in FIG. 13.

As shown in Tables 5 and 6, fluorspar may be provided in the reducible mixture to decrease the residence time. In the present experiments, the residence time is the time from the entry of the furnace to the exit. The fluorspar addition may be between about 1 and 4%.

The bimodal size distribution of carbonaceous material in the reducible mixture includes an amount of first reducing material useful in the reduction of the reducible material and an amount of second reducing material useful in the reduction of the reducible material, where the average particle size of the second reducing material is greater than average particle size of the first reducing material. The first carbonaceous reducing material has an average particle size that is smaller than the average particle size of the second carbonaceous reducing material. In one application, the first carbonaceous reducing material is about –28 mesh. Alternatively, the first carbonaceous reducing material may be about –35 mesh. Alternatively, the first carbonaceous reducing material may be about –48 mesh. Alternatively, the first carbonaceous reducing material may be about –65 mesh. Alternatively, the first carbonaceous reducing material may be about –100 mesh.

In one application, the second carbonaceous reducing material is between about 48 mesh and 3 mesh (i.e. 3/48 mesh). Alternatively, the second carbonaceous reducing material may be between about 48 mesh and 6 mesh (i.e. 6/48 mesh). Alternatively, the second carbonaceous reducing material may be between about 48 mesh and 8 mesh (i.e. 8/48 mesh). Alternatively, the second carbonaceous reducing material may be between about 48 mesh and 10 mesh (i.e. 10/48 mesh). Alternatively, the second carbonaceous reducing material may be between about 48 mesh and 14 mesh (i.e. 14/48 mesh). Alternatively, the second carbonaceous reducing material may be between about 48 mesh and 28 mesh (i.e. 28/48 mesh).

In other applications, the smaller size screen for the alternatives of the preceding paragraph for the second carbonaceous reducing material may be 28 mesh instead of 48 mesh, or may be 20 mesh instead of 48 mesh. In one example, the reducible material is finely ground taconite and the smaller screen size is between about 28 and 20 mesh, and the larger screen size is between about 14 and 6 mesh.

The first carbonaceous reducing material may include a plurality of carbonaceous materials, such as a combination of coals and/or char, or other combinations as desired. As shown in Tables 2 through 6, the second carbonaceous reducing material may be recycled anthracite. In one application, fines of recycled anthracite, such as −48 mesh, or −65 mesh, may be used in combination with coal in the first carbonaceous reducing material.

Figure 14:
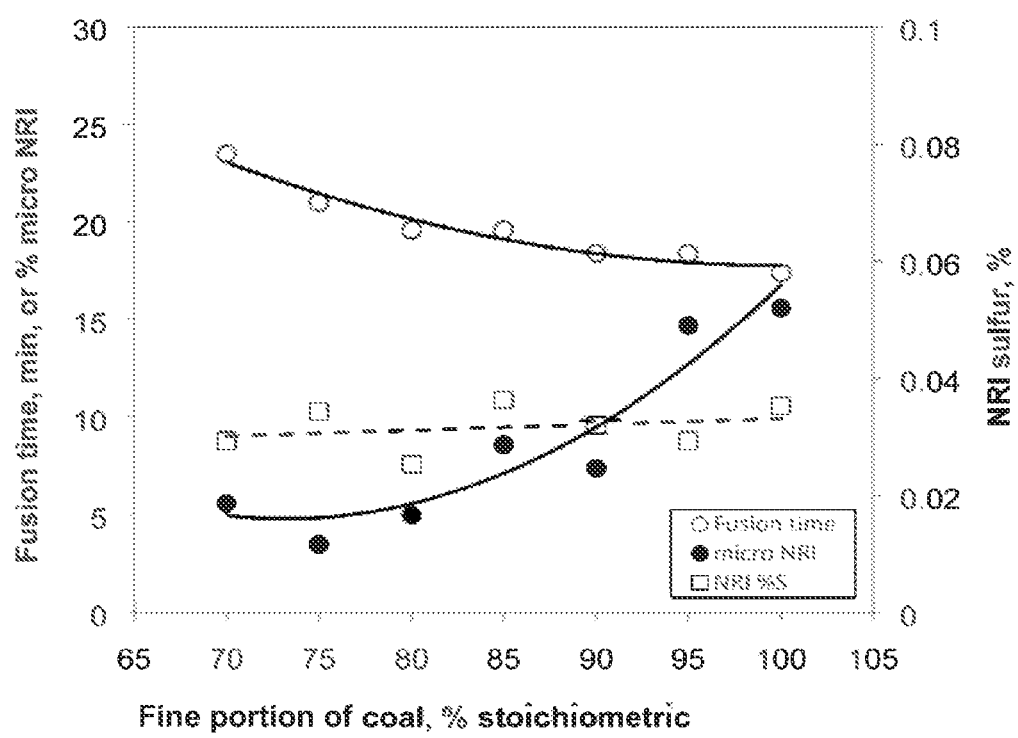
FIG. 14 is a graph showing the effect of increasing carbonaceous reducing material on fusion time, sulfur and micro-nugget generation.

The data from an initial test including mill scale as the reducible material, different amounts of high-volatile bituminous coal, 60% stoichiometric recycled anthracite of 6/28 mesh, 4% fluorspar, and a composition for slag basicity $B_2$ of 2.3 is plotted in FIG. 14 showing the effect of increasing first carbonaceous reducing material on fusion time, sulfur and micro-nodule generation. By reducing the amount of first carbonaceous material, the amount of micro-nodules can be reduced while maintaining a low sulfur level in the NRI product.

Table 7 below shows one experiment of the effect of fluorspar addition and basicity $B_2$ on the fusion time. In this application, the second carbonaceous reducing material was anthracite char of 6/28 mesh recycled anthracite and the basicity $B_2$ between 2.1 and 2.7. The composition of the reducible mixture used in a representative portion of the test of Table 7 is shown in FIG. 15.

TABLE 7

| Fluorspar, % | Slag basicity $B_2$ | Mix No. | LHF No. | Time in LHF, (min) | Micro NRI, (%) | NRI % C | NRI % S |
|---|---|---|---|---|---|---|---|
| 85% Stoich. coal[1] and 60% stoich. recycled anthracite ||||||||
| 4 | 2.7 | P-984 | 983 | 19.6 | 4.1 | 3.40 | 0.024 |
| 3 | 2.5 | P-1001 | 1018 | 23.5 | 5.6 | 3.15 | 0.032 |
| 3 | 2.3 | P-991 | 1003 | 19.6 | 4.5 | 2.96 | 0.037 |
| 2 | 2.7 | P-985 | 991 | >21.5 | — | — | — |
| 2 | 2.5 | P-1000 | 1026 | (23.5)[4] | 4.1 | 3.27 | 0.035 |
| 2 | 2.3 | P-990 | 995 | 21.5 | 3.1 | 3.46 | 0.034 |
| 85% Stoich. coal[1] and 40% stoich. recycled anthracite ||||||||
| 4 | 2.7 | P-988 | 987 | 19.6 | — | — | — |
| 3 | 2.5 | P-1003 | 1020 | 23.0 | 5.5 | 3.18 | 0.036 |
| 3 | 2.3 | P-997 | | | | | |
| 3 | 2.1 | P-993 | 1009 | >23.5[5] | — | — | — |
| 2 | 2.7 | P-989 | 989 | >29[3] | — | — | — |
| 2 | 2.5 | P-1002 | 1028 | (27.5)[4] | 6.7 | 3.37 | 0.044 |
| 2 | 2.3 | P-996 | 1016 | 24.5 | 5.4 | 3.21 | 0.060 |
| 2 | 2.1 | P-992 | 1006 | (23.5)[4] | 2.0 | 2.98 | 0.062 |
| 2 | 2.1 | P-1033 | 1069 | 33.5 | 7.0 | | 0.062 |
| 2 | 1.9 | P-1034 | 1070 | 38 | 4.9 | | 0.097 |
| 2 | 1.7 | P-1035 | 1071 | 50.5 | — | | 0.139 |
| 2 | 1.5 | P-1036 | 1072 | 50.5 | — | | 0.106 |
| 75% Stoich. coal[1] and 60% stoich. recycled anthracite ||||||||
| 3 | 2.5 | P-1005 | | | | | |
| 3 | 2.3 | P-999 | 1034 | 25.5 | 3.7 | 3.02 | 0.049 |
| 3 | 2.1 | P-995 | 1011 | (26.5)[4] | 5.8 | 3.23 | 0.053 |
| 2 | 2.5 | P-1004 | 1027 | 26.5 | 3.7 | 3.52 | 0.032 |
| 2 | 2.3 | P-998 | | | | | |
| 2 | 2.1 | P-994 | 1010 | (26.5)[4] | 6.3 | 3.29 | 0.051 |

[1]High-volatile bituminous coal.
[2]About 50% fused. No further tests.
[3]Longer residence time due to test interruption. About 50% fused. No further tests.
[4]62% of the normal weight used, as the briquettes exhausted.
[5]75% of the normal weight used, as the briquettes exhausted. About 67% fused. No further tests.

The amount of carbonaceous reducing material in the mixture with iron bearing material to form the reducible mixture 122 may vary depending upon the percentage of iron in the iron-bearing reducible material, the sources of reducible material and carbonaceous reducing material, the carbonaceous reducing material, the furnace used, as well as the furnace atmosphere maintained in which the reducing reaction takes place. In some embodiments, where the iron bearing material is hematite or magnetite or mixtures thereof, the amount of first carbonaceous reducing material in the reducible mixture may be less than where the iron bearing material in the reducible mixture is mill scale or the like with high levels of FeO.

The amount of first carbonaceous reducing material may be between about 65% and 95% stoichiometric. In one example, such as for mill scale as the reducible material, the amount of first carbonaceous reducing material may be between about 85% and 95% stoichiometric. Alternatively, such as for magnetite as the reducible material, the amount of first carbonaceous reducing material may be between about 80% and 90% stoichiometric. In yet another alternative, such as for hematite as the reducible material, the amount of first carbonaceous reducing material may be between about 65% and 75% stoichiometric. The amount of second carbonaceous reducing material may be between about 20% and 60% stoichiometric. Alternatively, the amount of second carbonaceous reducing material may be between about 30% and 50% stoichiometric.

The effect of the size of the coarse portion, or second carbonaceous material, in the reducible mixture is shown in Table 8. As shown in Table 8, reducing the size of the second carbonaceous material tends to increase the amount of micro-nodules.

TABLE 8

| Recycled Anthracite | | Time in | | |
|---|---|---|---|---|
| % stoich | Size (mesh) | LHF (min) | Micro NRI (%) | NRI % S |
| 40 | 6/28 | 24.5 | 5.4 | 0.060 |
| | 10/20 | | | |
| | 20/35 | 22.5 | 5.3 | 0.040 |
| | 35/65 | (22.5) | 7.5 | 0.038 |
| 60 | 6/28 | 21.5 | 6.2 | 0.034 |
| | 10/20 | 21.5 | 5.0 | 0.038 |
| | 20/35 | 20.5 | 7.1 | 0.037 |
| | 35/65 | (21.5) | 14.0 | 0.041 |

A smaller particle size of the reducible material tends to reduce fusion time in the present method. The effect of various particle sizes of mill scale is shown in Tables 9 and 10. In Table 9, mill scale ground to −20, −35, and −100 was compared in a box furnace, and in Table 10 the reducible mixture was processed in a linear hearth furnace. The size distribution of mill scale as received is shown in FIG. 6. In both the box furnace and the linear hearth furnace, the reduction of particle size decreased the fusion time. Additionally, the sulfur content in the iron nodules also decreased with reduction of particle size. But the amount of micro-nodules increased. A reduction of carbonaceous material in the reducing mixture may reduce the micro nodules as discussed above.

TABLE 9

| Grind | Fusion time, (min) | Micro NRI, (%) | NRI % S |
|---|---|---|---|
| As received | 4 | 0.6 | 0.038 |
| −20 mesh | 3.5 | 3.5[1] | 0.024 |
| | 4 | 1.2 | 0.027 |
| −35 mesh | 3.5 | 3.8 | 0.023 |
| −100 mesh | 3 | 6.1 | 0.018 |

[1]Nearly fully fused.

TABLE 10

| Grind | Time in LHF, (min) | Micro NRI, (%) | NRI % S |
|---|---|---|---|
| As received | 24.5 | 5.4 | 0.060 |
| −20 mesh | 21 | 8.2 | 0.044 |
| −35 mesh | 19.5 | 9.6 | 0.033 |
| −100 mesh | 18.5[(1)] | 16.3 | 0.030 |

[(1)]Stalled for 1.5 minutes in zone 1.

In one alternative, the reducible material may be taconite. The effect of varying basicity $B_2$ with the reducible material being taconite from one series of experiments is summarized in Table 11. The test of Table 11 includes taconite concentrate, 85% stoichiometric medium-volatile bituminous coal for first carbonaceous material and 40% stoichiometric recycled anthracite for second carbonaceous material. As shown in Table 11, the amount of micro-nodules increased as basicity $B_2$ increased. The composition of the reducible mixture of the test of Table 11 is shown in FIGS. 16A and 16B.

TABLE 11

| $B_2$ | Mix No. | $Al_2O_3$ in slag (%) | Fusion time (min) | micro NRI (%) | NRI % S |
|---|---|---|---|---|---|
| 2.3 | P-1083 | 11 | 3.5 | 17.8 | 0.015 |
|  | P-1081 | 15 | 3.5 | 12.9 | 0.020 |
| 2.1 | P-1088 | 11 | 3 | 11.8 | 0.016 |
|  | P-1087 | 15 | 3 | 5.9 | 0.017 |
| 1.9 | P-1084 | 11 | 3 | 8.9 | 0.017 |
|  | P-1082 | 15 | 3 | 3.0 | 0.024 |
| 1.7 | P-1090 | 11 | 2.5 | 1.9 | 0.024 |
|  | P-1089 | 15 | 3 | 2.7 | 0.022 |
| 1.5 | P-1093 | 11 | 3 | 2.4 | 0.031 |
|  | P-1094 | 15 | 3 | 2.3 | 0.029 |

TABLE 12

| | Fusion time (min) | | NRI % S | |
|---|---|---|---|---|
| $B_2$ | Taconite concentrate | Mill Scale | Taconite concentrate | Mill Scale |
| 2.5 | — | 6 | — | 0.026 |
| 2.3 | >15 | 4 | 0.017 | 0.038 |
| 2.1 | 9 | 4 | 0.018 | 0.036 |
| 1.9 | 5 | 4 | 0.020 | 0.050 |
| 1.7 | 4 | 4 | 0.028 | 0.053 |
| 1.5 | 5 | 5 | 0.033 | 0.058 |

As shown in Table 12, when the reducible material is taconite, without further adjustment to the slag composition the basicity $B_2$ may have a greater effect on fusion time as compared to mill scale. With both taconite and mill scale, decreasing basicity $B_2$ lowered the amount of sulfur in the NRI. We have found that an increase of $Al_2O_3$ in the slag, such as to 15% in the slag, will reduce the affect that basicity $B_2$ has on fusion time using taconite.

Additives may optionally be provided to the reducible mixture 122 separately or in combination for one or more purposes, in addition to the reducing material (e.g., coal or char) and reducible iron-bearing material (e.g., iron oxide material or iron ore). For example, additives may be provided for controlling slag basicity $B_2$, as binders and/or to provide binder functionality (e.g., lime can act as a weak binder for certain mixtures when wetted), for controlling the slag fusion temperature, to reduce the formation of micro-nodules, and/or for further controlling the content of sulfur in resultant iron nodules formed by the metallic iron nodule process. The table of FIG. 4 shows the chemical compositions of various exemplary additives to the reducible mixture 122. These additives include, for example, chemical compositions such as $Al(OH)_3$, bauxite, bentonite, $Ca(OH)_2$, lime hydrate, limestone, and Portland cement. Other additives may also be used such as $CaF_2$, $Na_2CO_3$, fluorspar, soda ash, aluminum smelter slag, cryolite, and $SiO_2$. Some of the exemplary additives contain trace amounts of Mg, as shown, and in some examples Mg should not be used in quantities that will produce 5% mass or more MgO in the resulting slag.

The reducible mixture 122 may be formed into compacts either in situ on the hearth or preformed as briquettes, balls or extrudates (with or without binder) suitable for use in forming metallic iron nodules by the disclosed process. Compacts refer to any compacted reducible mixture preformed or formed in situ as any desired discrete profile for positioning on the hearth layer. For example, discrete portions, compacts, may also be preformed balls or shaped reducible mixtures such as briquettes or extrudates, which may be preformed using compaction or pressure.

In the present method of making metallic iron nodules, the prepared reducible mixture 122 is heated in a drying/heating atmosphere to drive off moisture and heat the mixture, and then heated in a reducing atmosphere to drive off remaining moisture, fluidize volatiles in the carbonaceous materials and at least partially reduce the reducible mixture. Next, the at least partially reduced reducible mixture is heated in a fusion atmosphere above the melting point of iron to form, one or more metallic iron nodules and slag. As further shown in FIG. 2, resultant slag 126 on hearth material layer 120 is shown with the one or more metallic iron nodules 70. That is, slag beads on hearth material layer 120 are separated from the iron nodules 70 or attached thereto. The metallic iron nodules 70 and slag 126 (e.g., attached slag beads) are discharged from hearth 64, and the discharged metallic nodules are then separated from the slag 126.

This invention has been described with reference to illustrative embodiments and is not meant to be construed in a limiting sense. It will be apparent to one skilled in the art that elements or process steps from one or more embodiments described herein may be used in combination with elements or process steps from one or more other embodiments described herein, and that the present invention is not limited to the specific embodiments provided herein but only as set forth in the accompanying claims. Various modifications of the illustrative embodiments, as well as additional embodiments to the invention will be apparent to persons skilled in the art upon reference to this description.

What is claimed is:

1. A method for producing metallic iron nodules comprising the steps of:
    providing a hearth comprising refractory material;
    providing reducible mixture above at least a portion of the refractory material, the reducible mixture comprising at least reducing material and reducible iron bearing material;
    forming a reducible mixture comprising:
        a quantity of reducible iron bearing material,
        a quantity of first carbonaceous reducing material of a size less than about 48 mesh of an amount between about 65 percent and about 95 percent of a stoichiometric amount necessary for complete iron reduction of the reducible iron bearing material, and
        a quantity of second carbonaceous reducing material with an average particle size greater than average particle size of the first carbonaceous reducing material and a size between about 3 mesh and about 48 mesh of an amount between about 20 percent and about 60 percent of a stoichiometric amount of necessary for complete iron reduction of the reducible iron bearing material;

where the amount of first carbonaceous reducing material and second carbonaceous reducing material provide total reducing material carbon at least 100 percent of a stoichiometric amount necessary for complete iron reduction of the reducible iron bearing material;

thermally treating the reducible mixture in the presence of other carbonaceous material separate from the reducible mixture to form one or more metallic iron nodules.

2. The method for producing metallic iron nodules as claimed in claim 1 where amount of first carbonaceous reducing material and second carbonaceous reducing material provide total reducing material carbon between about 110 and 140 percent of a stoichiometric amount necessary for complete iron reduction of the reducible iron bearing material.

3. The method for producing metallic iron nodules as claimed in claim 1 where the quantity of first carbonaceous reducing material being of an amount between about 80 percent and about 90 percent of a stoichiometric amount necessary for complete iron reduction of the reducible iron bearing material.

4. The method for producing metallic iron nodules as claimed in claim 1 where the quantity of first carbonaceous reducing material being of an amount between about 85 percent and about 95 percent of a stoichiometric amount necessary for complete iron reduction of the reducible iron bearing material.

5. The method for producing metallic iron nodules as claimed in claim 1 where the quantity of first carbonaceous reducing material being of an amount between about 65 percent and about 75 percent of a stoichiometric amount necessary for complete iron reduction of the reducible iron bearing material.

6. The method for producing metallic iron nodules as claimed in claim 1 where the quantity of second carbonaceous reducing material being of an amount between about 20 percent and about 50 percent of a stoichiometric amount necessary for complete iron reduction of the reducible iron bearing material.

7. The method for producing metallic iron nodules as claimed in claim 1 where the first carbonaceous reducing material is a size less than about 65 mesh.

8. The method for producing metallic iron nodules as claimed in claim 1 where the first carbonaceous reducing material is a size between about 65 mesh and about 100 mesh.

9. The method for producing metallic iron nodules as claimed in claim 1 where the second carbonaceous reducing material is a size between about 48 mesh and about 6 mesh.

10. The method for producing metallic iron nodules as claimed in claim 1 where the first reducing material is a carbonaceous material with between 2 and 40% average volatiles.

11. The method for producing metallic iron nodules as claimed in claim 1 where the second reducing material is a non-coking carbonaceous material with less than 10% average volatiles.

12. The method for producing metallic iron nodules as claimed in claim 1 where the second reducing material is a non-coking carbonaceous material with between 1 and 8% average volatiles.

13. The method for producing metallic iron nodules as claimed in claim 1 further comprising the step of:
prior to the step of thermally treating the reducible mixture, forming the reducible mixture into agglomerates.

14. The method for producing metallic iron nodules as claimed in claim 1 where the second carbonaceous reducing material is a size less than 20 mesh and further comprising the step of:
prior to the step of thermally treating the reducible mixture, forming the reducible mixture into balls.

15. The method for producing metallic iron nodules as claimed in claim 1 where the first carbonaceous reducing material includes at least two sources of carbonaceous material, at least one source being fines less than about 48 mesh from a source of carbonaceous material in the second carbonaceous reducing material.

16. The method for producing metallic iron nodules as claimed in claim 1 where the basicity $B_2$ of the reducible mixture, defined as the ratio of $CaO/SiO_2$ in the mixture, is between 1.5 and 2.3.

17. The method for producing metallic iron nodules as claimed in claim 1 where the basicity $B_2$ of the reducible mixture, defined as the ratio of $CaO/SiO_2$ in the mixture is between 1.9 and 2.3.

* * * * *

UNITED STATES PATENT AND TRADEMARK OFFICE
CERTIFICATE OF CORRECTION

PATENT NO. : 8,690,988 B2  
APPLICATION NO. : 13/653186  
DATED : April 8, 2014  
INVENTOR(S) : Iwao Iwasaki Page 1 of 1

It is certified that error appears in the above-identified patent and that said Letters Patent is hereby corrected as shown below:

In the Specification:
 Column 1, lines 14-17
    delete "The present invention was made with support by the Department of Energy, Sponsor Award DE-FG36-05GO15185. The United States government may have certain rights in the invention."
    insert -- This invention was made with government support under Sponsor Award DE-FG36-05GO15185 awarded by the Department of Energy. The government has certain rights in the invention. --

Signed and Sealed this
Tenth Day of June, 2014

Michelle K. Lee
*Deputy Director of the United States Patent and Trademark Office*